(12) United States Patent  (10) Patent No.: US 7,725,238 B2
Perkins  (45) Date of Patent: May 25, 2010

(54) SYSTEM AND METHOD FOR SMART SYSTEM CONTROL FOR FLOWING FLUID CONDITIONERS

(76) Inventor: Michael T. Perkins, 902 McPhaul St., Austin, TX (US) 78758

( * ) Notice: Subject to any disclaimer, the term of this patent is extended or adjusted under 35 U.S.C. 154(b) by 904 days.

(21) Appl. No.: 11/295,429

(22) Filed: Nov. 18, 2005

(65) Prior Publication Data
US 2007/0000247 A1  Jan. 4, 2007

(51) Int. Cl.
  *G06F 19/00* (2006.01)
  *F02B 33/00* (2006.01)
(52) U.S. Cl. .................................. 701/103; 123/563
(58) Field of Classification Search ......... 701/101–105, 701/115; 123/643, 649, 655, 656, 563, 565, 123/41.1; 60/599, 608; 62/3.2, 3.7
  See application file for complete search history.

(56) References Cited

U.S. PATENT DOCUMENTS

| | | | | |
|---|---|---|---|---|
| 4,485,310 A | 11/1984 | de Valroger | ................... | 290/52 |
| 4,724,817 A | 2/1988 | Cook | ................... | 123/565 |
| 4,781,165 A * | 11/1988 | Rawlings | ................... | 123/555 |
| 5,577,385 A | 11/1996 | Kapich | ................... | 60/612 |
| 5,638,796 A | 6/1997 | Adams | ................... | 123/565 |
| 6,328,024 B1 | 12/2001 | Kibort | ................... | 123/565 |
| 6,461,265 B1 | 10/2002 | Graham | ................... | 475/5 |
| 6,580,025 B2 | 6/2003 | Guy | ................... | 136/201 |
| 6,609,416 B2 | 8/2003 | Brock | ................... | 73/116 |
| 6,615,809 B1 | 9/2003 | Martin | ................... | 123/559.1 |
| 6,718,955 B1 | 4/2004 | Knight | ................... | 123/559.1 |
| 6,880,495 B2 * | 4/2005 | Le Lievre et al. | ................... | 123/41.1 |
| 6,962,139 B2 | 11/2005 | Russell | ................... | 123/348 |
| 6,962,143 B2 | 11/2005 | Ryan | ................... | 123/481 |

(Continued)

FOREIGN PATENT DOCUMENTS

GB  2231142 A  11/1990  ................ 165/54

(Continued)

OTHER PUBLICATIONS

"Brushless DC", Ward Brown, 2002, Microchip Technology Inc. www.microchip.com.

(Continued)

*Primary Examiner*—Stephen K Cronin
*Assistant Examiner*—Johnny H Hoang
(74) *Attorney, Agent, or Firm*—PEI; Michael T. Perkins

(57) ABSTRACT

A method and system for temperature and boost control of engine intake air by use of an active conditioner control unit, which regulates relative amounts of electric current to at least one active conditioning device and an electrically driven booster motor. In one preferred embodiment it controls valves which optimally direct the path of airflow through a plurality of thermal conditioner storage chambers in response to signals from engine load level, temperature, and other sensors in order to optimally provide temperature conditioned air to the engine. This embodiment of the invention features immediate and efficient provision of conditioned and pressurized airflow to an internal combustion engine and removes parasitic power drains during low demand situations. This invention enhances cold start performance and operation with a pre-start thermal conditioner with warming capabilities. System increases flexibility for stationary operation and traffic restraints by supplementing heat sink transfers. System sensor array with advanced sensors monitoring combustion parameters to safely facilitate additional power output from host engines.

4 Claims, 12 Drawing Sheets

U.S. PATENT DOCUMENTS 6,966,278 B2 * 11/2005 Takahashi .................. 123/41.1
7,076,941 B1 * 7/2006 Hoffman et al. .............. 60/643
7,100,369 B2 * 9/2006 Yamaguchi et al. ........... 60/324

FOREIGN PATENT DOCUMENTS

JP       403134229 A    6/1991   ................ 123/536

OTHER PUBLICATIONS

Electrical an electronic equipment for 42V networks, Sep. 8, 2004, ISO/PRF 21848, Road vehicles, Electrical loads.
A purely Ultracapacitor Energy Storage System for Hybrid Electric Vehicles Utilizing a Microcontroller-Based dc-dc Boost Converter, 2003, Cegnar, etal U of Idaho, Safeting, 1998.

* cited by examiner

SYSTEM AND METHOD FOR SMART SYSTEM CONTROL FOR FLOWING FLUID CONDITIONERS

FEDERALLY SPONSORED RESEARCH

Not Applicable

SEQUENCE LISTING OR PROGRAM

Not Applicable

BACKGROUND

1. Technical Field of Invention

This invention relates to systems and methods for maximizing engine power output through the use of smart controllers for active conditioners and pressurizers of incoming air. The Smart System Controller for Flowing Fluid Conditioners (SSCFFC) invention is specifically for monitoring and control of the pressure boosting, cooling and heating of said incoming air in applications that require environmental flexibility and on-demand efficiency enhancement capability.

2. Description of Prior Art

The trend toward smaller automobile engines is driven by a need to meet targets for lower carbon dioxide and other emissions. In order to achieve this goal, the auto industry is introducing smaller engines that are more fuel-efficient, but customers have come to expect a high level of performance. Designers are able to choose from two main methods of raising output power of smaller engines; first, tweaking, that is to adjust cam timing (lift, attack and duration of cam lobes), advance spark and duration, and fuel timing and duration. Second, boost assist, that is adding a compressor that will increase the amount of air injected into an engine for a given inlet valve opening. With either of these methods, incoming air temperature is critical to performance and emissions. Whether an engine is self-combusting (as with diesels) or sparked, a critical amount of air and fuel at a set temperature will contribute to efficient combustion. A small variation in temperature (above or below optimal) can cause operational problems at best and even catastrophic failures in some cases. In order to meet these tight restrictions, designers have most often used boosted or assisted aspiration technologies. For example, small engines with turbochargers have been implemented to match the peak power of larger naturally aspirated units while still having the benefit of using less fuel and exhausting lower CO2 concentrations. Intercoolers have been used as a natural complement to forced air aspiration systems that naturally tend to heat the air as they compress. This choice has much to do with the reality that to date only reactive technologies have been available to compensate for temperatures outside ideal ranges. Reactive technologies in this disclosure refer to passive intercoolers; spark retarding engine controllers, and other devices without smart control and engine monitoring sensors.

Temperature directly affects the performance of an internal combustion engine. So that the ability to cool the air input into an engine will directly increase efficiency and horsepower. Air charge temperature also affects wear and reliability of engine components. Therefore, a lower temperature input during high demand load periods will lengthen engine life, reduce emissions and improve overall performance. Recently several new active fluid conditioning devices have been introduced for use in motor vehicles to accomplish cooling of the air just prior to engine intake. Specifically, active elements have now been applied to intercoolers. Said designs such as U.S. Pat. No. 5,547,019 provide cooling from thermoelectric devices. But invention U.S. Pat. No. 5,547,019 will have too slow a response time to be effective with the type of loads, and under such conditions, that can be characterized as "on-demand operation". Because it is located directly in the air path for normal operation it will constantly be draining the power supply. A mechanism is necessary to control this large power drain. U.S. Pat. No. 6,758,193 introduces a by-pass or alternative air passage to the active cooler. Chilling of incoming air is more efficient because it is provided only upon operator initiation. There is no advantage to conditioning during normal driving. That is, requiring operation of the Peltier Junctions in a steady-state condition would be prohibitively power demanding. Also, use in a strictly manual fashion during vehicle driving is not practical. The cooling response time of U.S. Pat. No. 6,758,193 (with a reservoir of stored BTU) can be useful when turned on manually for competition in drag racing type events. But neither invention described above provides for practical automatic control for embodiment operation. Therefore, a control solution, which can perform under demand conditions as required in normal driving conditions for passing does not exist. For example, no WOT signal is discussed or provided in prior discussion of intercoolers. Without adequate strategic controls, the existing intercooler inventions will achieve no net benefits in real world (non-performance competition) applications. Despite technological advances with intercoolers, several critical weaknesses remain in all prior systems. Prior art does not provide for handling large temperature gains in the charged air by virtue of being air-to-air based intercoolers (these designs can not achieve wide temperature differentials due to the heat sink temperature always at or above ambient temperature). Of the active systems, prior art runs the thermoelectric continuously during peak demands thereby draining engine power and does not have a control mechanism to achieve efficiency of operation. Additionally, no production engines have been tweaked (tuned for absolute maximum performance) as no dedicated intercooler control system has offered smart temperature compensation. No smart controller has been proposed that can supervise and schedule operation, enhancement, recharging, and system override of an actively chilled electronic supercharger. Also, no controllable conditioner with active temperature enhancement for increased temperature range was available prior to disclosure by present inventor, Flowing Fluid Conditioner (FFC), Perkins, Ser. No. 10/930,998, Aug. 31, 2004. No warmer type intercooler with active temperature enhancement was available prior to FFC. Additionally, no integrated conditioning and boosting system was available prior to On Demand Boost Conditioner (ODBC), Perkins, 60/628,490, Nov. 15, 2004. No systems that can alternately cool or warm boosted air are available prior to FFC. No system buffer was available that complements a smart controller. No system that could provide advanced sensing capabilities for measurement of critical temperature and combustion signatures is presently available. No sensor or control unit exists that can detect or moreover correct for engine abnormal combustion situations. No system is available that integrates these functions, is compatible with OBD-2 and CAN standards, and can interface them interactively with the host vehicle.

SUMMARY AND OBJECTS OF THE INVENTION

Objects of the Invention

In view of the above state of the art, the present invention seeks to realize the following objects and advantages. It is a primary object of the present invention to provide a smart device that can control active intercoolers to provide cooling at the intake of an internal combustion (self or sparked) engine (normal or boosted) in an on-demand fashion to improve power that it is available for emergencies, high demand conditions, at idle, in traffic, or as selectively required.

It is an object of the present invention to provide a smart system that can control active intercoolers to provide warming of the air intake to the engine to improve start of engine under cold conditions and also reduce cold engine emissions.

It is another object of the present invention to provide a smart device that can control active boosting (pressurizing) products including superchargers and turbochargers to provide fine control of boosted air at the intake of an internal combustion (self or sparked) engine (normal or boosted) in an on-demand fashion to improve power that it is available for emergencies, high demand conditions, at idle, in traffic, or as selectively required, It is an object of the present invention to provide a smart controller with a family of sensors that can monitor and inform controller of conditions for decisions on how to control active intercoolers and active boosting devices to provide regulation of pressure and temperature of the air at intake to the engine to improve engine performance under varying conditions and demands. Therefore, an engine can be more finely tuned for example to take advantage of the ability to chill when things get hot. SSCFFC invention will remove side effects of these adjustments, with temperature reduction metered to offset temporary conditions that are encountered.

It is another object of the present invention to be compatible for use in conjunction with other devices. Thus this invention can be used along with air-to-air or air-to-water intercoolers. Additionally, controller through use of an electronic waste gate can control mechanical and other engine driven boosters.

It is another object of the present invention to detect abnormal combustion events including detonation and pre-ignition and exert control to provide conditioning or other means to counteract the abnormal combustion. SSCFFC may control temperature reduction of fuel-air charge mixture, increase fuel prior or subsequent to sparking, control boost level (for example, boost will be lowered with reduction of motor RPM in electrically driven superchargers, or for classical boosters by control of an electronic waste gate to bleed off boost), spark advance can be retarded, and valve timing advance decreased.

It is further object of the present invention to sense battery and auxiliary power reserves and automate the decision about which power source to employ and for how long it is possible to power the fluid flow conditioners without draining the supply.

SUMMARY OF THE INVENTION

In accordance with the present invention, the SMART SYSTEM CONTROLLER for FLOWING FLUID CONDITIONERS (SSCFFC) affords a simple, flexible, and reliable controller that works in conjunction with new sensor devices to raise or lower intake fluid temperature or pressure as required to maximize engine efficiency or power, or when on-demand by a driver. The present invention is specifically an intake temperature and boost monitor and control unit for intercoolers, superchargers, and turbochargers. The SSCFFC monitors and controls critical engine parameters to regulate relative amounts of electric current to an active cooling device, controls valves to divert the path of airflow through multi-chamber intercoolers based on and in response to driver activity and engine load. A supplemental heat dissipation device is provided for improved system operation during idle and stop and go traffic. Additionally, engine control functions are adjusted in response to SSCFFC environmental sensor measured conditions. When an engine is operated under a standard warming up operation or a low engine load, the SSCFFC deactivates current to the thermoelectric cooler and adjusts the selecting valve to increase airflow through the by-pass chamber in order to optimize engine operation efficiency and preserve battery charge.

When the engine is operated under a high engine load or wide-open throttle, the SSCFFC deactivates the current to the thermoelectric cooler, and adjusts the valve to divert airflow over the heat sink and through the cooling chamber to the engine. This allows the engine to benefit from the previously "stored" chill in the exchanger and minimizes the alternator load during peak operation.

During normal driving conditions, thermo-sensors (thermistors or thermocouples) give information to the SSCFFC, which in response regulates the temperature of an exchanger core inside an insulated cooling chamber ensuring that it is always at low temperature. In addition the SSCFFC system incorporates an advanced sensor that resonates with the wavefront of the escaping exhaust gases. This sensor captures and transmits pressure information to the analog interface of the processor where the wavefront signal is processed by a Fourier Transform to determine the frequency content. The frequency content and time course of the exhaust gas wavefront is compared to data regarding anomalous conditions that is stored in the processor memory. When problem-indicating frequency content is detected a signal is sent to alert the operator (driver). Additionally, critical engine parameters can be adjusted by the SSCFFC before the next engine cycle. These adjustable parameters include among others; amount of temperature conditioning, spark advance, fuel enrichment, valve timing and boost level (if engine is boosted). With this sensor monitoring and actuator control an engine can be run at the upper limit of power output when needed and if a problem situation occurs (ex. component failure or fuel contamination) the controller will adjust or compensate for the situation. The SSCFFC controller performs analysis of every combustion chamber every cycle under high demand and by making necessary adjustments enables an engine to operate at maximum horsepower when needed.

As a result of the temperature of engine aspiration being lowered on-demand, the engine wide-open throttle power is increased and overall fuel efficiency is increased. In the event that the system SSCFFC fails, the SSCFCC assures that failure state of the system is in the normal aspiration state.

The majority of performance requirements when driving on streets and highways are satisfied by short bursts of power on the order of less than thirty seconds. Even drag races between performance vehicles are typically staged for a quarter mile and completed in less than thirty seconds. The SSCFFC invention is ideally suited to be adapted to hybrid and combination designs of superchargers and turbochargers, but also with normally aspirated engine configurations. The SSCFFC invention can be used to control input to any system that can benefit from the cooling of hot air to make it denser.

Cold start conditions cause combustion engines to have drivability and emission problems. The SSCFCC invention also offers automotive designers a system that will pre-warm intakes for smoother starting and reduced emissions. Additionally, SSCFFC will continue to produce warm air (after cranking and starting) for smooth operation until the engine can warm itself and operate normally.

The SSCFFC device will also function to control on-demand in line intercoolers and can work with existing air-to-air, water-to-water, or air-to-water or coolant intercoolers which are used during on-demand situations. With inclusion of an SSCFFC device, their operation and performance will be more responsive, powerful and less prone to premature failures. The SSCFFC invention has a small footprint, which can be built into housings, castings or adapters for very localized fluid temperature conditioning.

A modern internal combustion engine produces power through combustion. This combustion is the burning of a fuel and air mixture charge in the combustion chamber. This burn should progress from the ignition point (as with a spark plug in a sparked engine) progressing across the chamber in an orderly fashion. This burn moves across the chamber and cools against cylinder walls and piston crown. An optimal burn will be complete and leave no fuel-air residuals.

However, Detonation and Pre-ignition are two types of abnormal combustion that frequently prevent optimal burn. Detonation is the spontaneous combustion of the residual fuel-air mixture resulting from an incomplete combustion event. Note: This occurs after fuel-air mixture charge has been ignited by spark from distributor. A spontaneous combustion occurs as a pressure spike partially ignites residual fuel-air. An engine that "runs on" after being shut off is a good example of detonation. Symptoms include a sound often called a ping, ring or knock that resonates at about 6 to 8 k hertz. This sound is a result of energy crashing into a component in the combustion chamber as a result of the energy spike.

Pre-ignition is when the fuel-air mixture charge is ignited prior to the spark plug being "sparked" by the engine's distributor. There are no obvious symptoms for pre-ignition as there are with detonation. When pre-ignition happens is there is a great amount of pressure on the piston due to the poorly timed detonations (before the piston can turn around). The only know characteristics of pre-ignition prior to damage occurrence are increased pressure as discussed above and a loss of temperature in the exhaust. There is a temperature loss in the exhaust because the igniting of fuel-air mixture peak is diminished and energy is transferred into components such as valves and pistons.

The SSCFFC invention can be used to assist in detection of these abnormalities in combustion. Detonation is detected by sensor AS or with a knock sensor that most host vehicles use as part of their engine management mapping strategy safety net. Sensor AS will additionally detect reduced power by lower amplitude on main combustion envelope. SSCFFC analyzes these sensor inputs to detect detonation.

Likewise the SSCFFC can detect Pre-ignition by monitoring when the combination of signal MAF is slowed or reduced unexpectedly, sensor AS detects a reduced amplitude as with detonation accompanied by a bias or shift in envelope base line, and unexpected reduction of combustion temperature as measured in exhaust.

When the SSCFFC invention detects combustion problems it will exert control to provide conditioning or other means to counteract the abnormal combustion. For example, it may provide situation resolution with temperature reduction of fuel-air charge mixture. In the event this solution is ineffective, SSCFFC invention may increase fuel (in opposition i.e. if detonation is occurring fuel will be added prior to sparking, if pre-ignition is occurring fuel will be added subsequent to sparking), or boost level can be reduced (for example with electrically driven superchargers, boost will be lowered with reduction of motor RPM, a classical booster will be controlled with an electronic waste gate to bleed off boost), spark advance can be retarded, and valve timing advance decreased.

Most importantly, SSCFFC improves combustion at all high demand loads and at cold start/operation. With these improvements a colder range spark plug can be used to improve high demand power output and lower deposits in the cylinder chamber. Lower deposit levels will reduce the main causes of detonation-induced pre-ignition.

BRIEF DESCRIPTION OF THE DRAWINGS

The following discussion assumes the reader is familiar with internal combustion engines, heat flow, turbochargers, intercoolers, and electronic controllers.

REFERENCE NUMERALS IN DRAWINGS

Figure 1A:
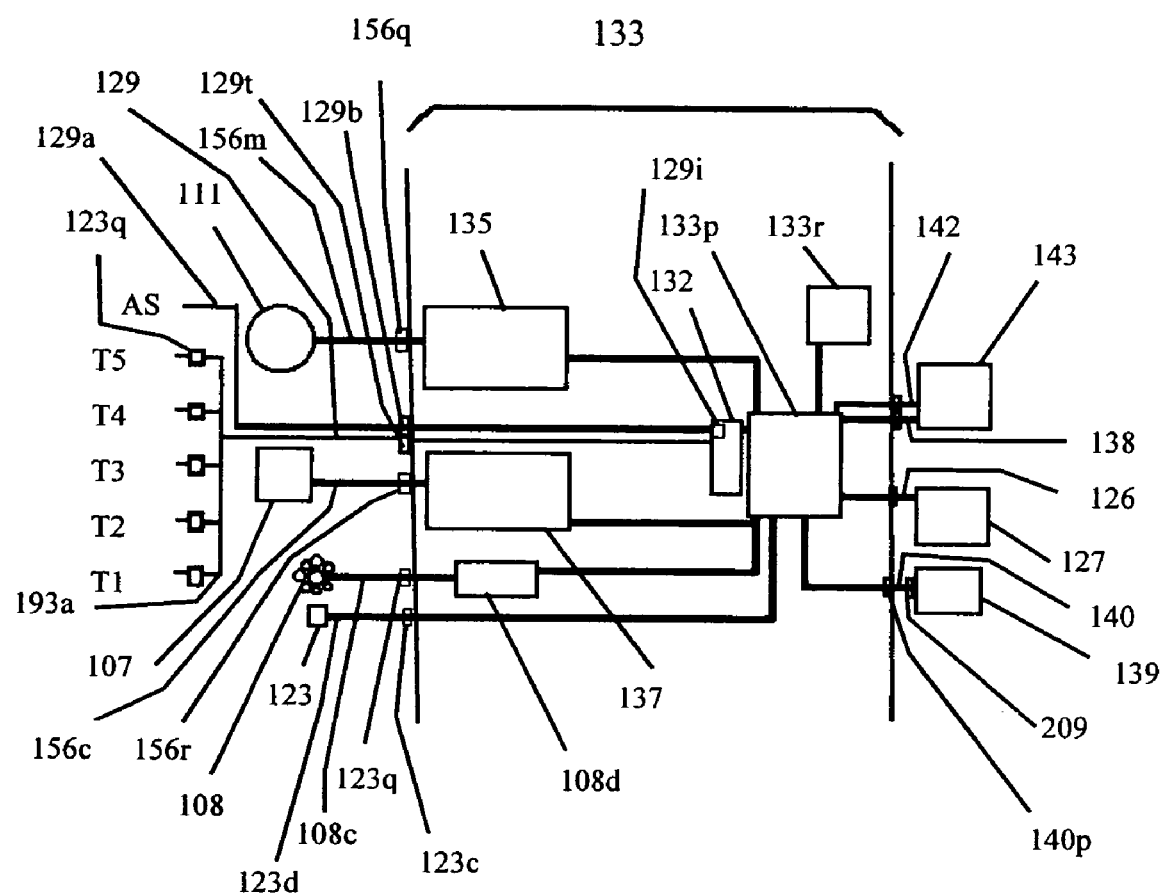
FIG. 1a shows a block diagram of the SSCFFC system.

| Number | Title | Supplier |
|---|---|---|
| 101 | Conditioner | |
| 102b | Brace 102 (f to r) bolt (×4) | Grade 5, 5/16" NC |
| 102f | Brace (front) bracket (×2) | Steel |
| 102g | Mounting hole (in brace 102f) (×2) | 5/16" |
| 102h | Threaded hole (in brace 102r) (×2) | 5/16" NC |
| 102r | Brace (rear) bracket (×2) | Steel |
| 103 | Turbine housing | Majestic turbo www.majesticturbo.com |
| 103b | Mounting hole (×3) in 103f | 5/16" |
| 103f | Front half housing 103 | |
| 103h | Mounting hole (×4) | Aligned mounting tab holes in housings 103f and 103r, 5/16" |
| 103m | Mounting plate air cleaner 104, by-pass 109 to housing 103 | |

-continued

| Number | Title | Supplier |
|---|---|---|
| 103n | Threaded mounting hole in plate 103m (×3) | 5/16" NC |
| 103r | Rear half housing 103 | |
| 104 | Air cleaner (K&N filters) | www.knfilters.com |
| 104c | Hose clamp | 2.5 to 4.0" www.idealclamp.com |
| 104t | Air cleaner throat | plastic |
| 105 | Conditioner housing | Isolative composite or Glass reinforced plastic, double walled |
| 105c | Conditioner housing cover | Isolative composite or Glass reinforced plastic, double walled |
| 105f | Conditioner housing front | Isolative composite or Glass reinforced plastic, double walled |
| 105i | Conditioner housing inlet | 2" to 3" typical Isolative composite or Glass reinforced plastic |
| 105o | Conditioning cover opening for TED 107 mounting | |
| 105r | Conditioner housing rear | Isolative composite or Glass reinforced plastic, double walled |
| 107 | Thermoelectric device (TED) | MCX470+T, Swiftech |
| 107s | Screw (×4) | # 8 NF grade 4 |
| 107t | Threaded hole (×4) in plate 128p | # 8 NF |
| 108 | Fan | Vantec Tornado-TD8038H from www.cooltechnica.com |
| 108c | Fan power cable | 2 cond AWG 14 |
| 108h | Threaded mounting bracket hole | #8 NF |
| 108s | Screw (×4) | # 8 NF |
| 108d | Fan motor current driver | MOSFET, P ch. FDV304PCT-ND www.digikey.com |
| 109 | By-pass | Plastic |
| 109b | Air cleaner 104 to plate 103m adapter | metal |
| 109s | Adapter mounting bolts (×3) | 5/16" NF |
| 110 | Hose connector (reinforced silicon) | 2.25" to 3.0" http://turbotech.com |
| 110a | Hose clamp | 2.25" to 3.0" www.idealclamp.com |
| 110b | Hose clamp | 2.25" to 3.0" www.idealclamp.com |
| 111 | Motor | Merkle-Korff (www.kinetekinc.com), or Xtreme Energy (www.xtreme-energy.com) |
| 111h | Mounting holes (×4) in housing 103r | 5/16" |
| 111s | bolt (×4) | 5/16" NF grade 5 |
| 111t | Threaded hole (×4) | 5/16" NF |
| 113 | By-pass outlet | 2.25" to 3.0" dia. |
| 114 | Motor shaft | Hardened steel 3/8" dia. Threaded end 3/8" NF |
| 114t | Threads on shaft 114 end | 3/8" NF |
| 115 | Conditioner housing outlet | 2.25" to 3.0" dia |
| 116 | Bearing (ceramic, air or magnetic | Majestic turbo www.majesticturbo.com |
| 117 | Actuator shaft | Stainless steel |
| 118 | Lock nut (blade 125 to threads 114t) | 3/8" NF, Majestic turbo www.majesticturbo.com |
| 119 | By-pass butterfly valve plate | Brass |
| 120 | Warm air inlet (from pipe 160) | |

-continued

| Number | Title | Supplier |
|---|---|---|
| 121 | Conditioner butterfly valve plate | Brass |
| 122 | Warm air flap valve (normally closed) | Host vehicle |
| 123 | Actuator with positioning information | Type 56AA-12DC from http://www.chemline.com |
| 123c | Quick release connector signal and actuator 123 drive pair | D sub 15 pin AML15G-ND AFL15K-ND www.digikey.com |
| 123d | Actuator 123 drive cable | Belden 89731 24 AWG 6 pair high temp, oil resistant cable |
| 123q | Quick release connector pair for sensors T1 through T5, 210 and fan 108 | HEGO type connector pair ANP-2PSC www.shonutperformance.com |
| 124 | Warm air pipe | Host vehicle |
| 125 | Turbine blade | Majestic turbo www.majesticturbo.com |
| 126 | Cable (host ECU 127 to processor 133) | AWM E148000 style 2464, 26 AWG, VW1SC ODB2 cable www.nology.com |
| 126d | Processor 133 connector (for cable 126 | RS-232 9 pin D shell female/male AFL09K-ND www.digikey.com |
| 126p | ODB-2 connector | 16 pin female (mate to host vehicle) |
| 127 | Engine Control Unit processor (ECU) | OBD-2 or CAN standards Society of Automotive Engineers |
| 128 | Exchanger | Radiator for exchanging air with thermoelectric device typically copper |
| 128h | Opening hole | Accommodates 107 and mounting holes 107t |
| 128p | Exchanger 128 top plate | copper |
| 129 | Sensor cable (T1-T5,) | Belden 89731 24 AWG 6 pair high temp, oil resistant cable |
| 129a | Sensor cable (AS) | 50'Ω coax A305-100-ND www.digikey.com |
| 129b | Advanced sensor cable 129 connector pair | BNC type ABM-1700-M ABF-1700-F www.hyperlinktech.com |
| 129i | Advanced sensor processor | Fast Fourier Transform (FFT) processor DSP TI320C55. Texas Inst. or ADSP-2100, Analog Devices |
| 129t | Sensor connector pair | D sub 15 pin AMR15G-NP AFL15K-N www.digikey.com |
| 132 | Sensor interface (analog) to processor 133p | MCP6S26 PGA w analog mux. www.microchip.com |
| 133 | Smart controller | Contained in such as housing KS142S from Rittal Company |
| 133p | Smart controller 133 processor | DSP controller w/DSP output PIC16F877 www.microchip.com |
| 133r | Real time clock | IC counter w/osc. MC74HC4060A www.digikey.com |
| 134 | Combiner | 2.25" to 3.0" thin wall steel |
| 134b | Combiner 134 by-pass input | 2.25" to 3.0" thin wall steel |
| 134c | Combiner 134 conditioner input | 2.25" to 3.0" thin wall steel |
| 134o | Combiner 134 output | 2.25" to 3.0" thin wall steel |

-continued

| Number | Title | Supplier |
|---|---|---|
| 135 | Motor 111 driver | CMOS quad driver pair and HEXFET power MOSFET pair www.microchip.com or e-Boost www.turbosmart.com |
| 137 | TED 107 driver | CMOS quad driver pair and HEXFET power MOSFET pair www.microchip.com |
| 138 | Buffer 143 to smart controller 133 data cable | RS-232 shielded cable ANC10RS www.nextag.com |
| 138b | Buffer 143 data connector | RS 232 D sub male AML09K-ND www.digikey.com |
| 138c | Controller 133 connector (to cable 138 | RS-232 9 pin D shell female AFL09K-ND www.digikey.com |
| 139 | Operator display | Plastic and rubber enclosure ABS-94HB www.pactecenclosures.com |
| 140 | Display cable | RS-232 shielded cable ANC10RS www.nextag.com |
| 140p | Processor 133p connector to cable 140 | 9 pin female AFL09K-ND www.digikey.com |
| 141 | Power cable battery 149 to buffer 143 | Monstercable 4 AWG 2 cond. S4GP-15 (black) + S4GP-15 (red) chemical and temperature resistant www.monstercable.com |
| 142 | Power cable buffer 143 to smart controller 133 | Monstercable 4 AWG 2 cond. S4GP-15 (black) + S4GP-15 (red) chemical and temperature resistant www.monstercable.com |
| 142b | Power connector (×4, up to 4 cables ea.) | AN-1470G1H-P www.action-electronics.com |
| 142p | Power connector (×2) cable 148 and 141 | Ring connector NY12R www.autoelectrical.com |
| 143 | Power buffer | 14 to 42 volt controller Novanta www.evolution.skf.com |
| 144 | Engine | Host vehicle |
| 144m | Exhaust manifold | Host vehicle |
| 145 | Auxiliary power | 14-42 volts battery, capacitor, or fuel cells |
| 146 | Power 145 to Buffer 143 cable | Monstercable 4 AWG 2 cond. S4GP-15 (black) + S4GP-15 (red) chemical and temperature resistant www.monstercable.com |
| 147 | Alternator (recharging) | Host vehicle 14 to 42 volts |
| 148 | Alternator 147 to Buffer 143 cable | Monstercable 8 AWG 2 cond. S8GP-15 (black) + S8GP-15 (red) chemical and temperature resistant www.monstercable.com |
| 149 | Battery (host) | 14-42 volts |
| 150 | Throttle body | Host vehicle |
| 150b | Throttle body 150 butterfly valve | Host vehicle |
| 151 | Throttle position sensor (TPS) | Host vehicle |
| 151f | Accelerator pedal | Host vehicle |
| 156c | TED 107 drive cable controller to TED 107 | Alphawire XTRA-GUARD 87703CY 10 AWG spiral oil resistant, high heat www.alphawire.com |
| 156m | Motor 111 Drive cable controller 133 to motor 111 | Belden 10 AWG 2 conductor high temp., oil resistant cable www.belden.com |
| 156q | Cable 156m connector pair | SNP-2PSC www.shonutperformance.com |
| 156r | Cable 156c connector pair | SNP-2PSC www.shonutperformance.com |
| 158 | Inlet hose (101 to 150) reinforced silicon | 2.25" to 3.0" flexible hose" http://turbotech.com |
| 160 | Exhaust pipe | host |

-continued

| Number | Title | Supplier |
|---|---|---|
| 162c | Combustion chamber (in host engine) 144 | |
| 162i | Intake valve (in host combustion chamber 162c | |
| 162o | Exhaust valve (in host combustion chamber 162c | |
| 187 | Crankshaft position signal | Host vehicle |
| 189 | Vehicle speed signal | Host vehicle |
| 191 | Revolutions per minute signal (RPM) | Host vehicle |
| 193 | Manifold air pressure (MAP) signal | Pounds per square inch (psi) Host vehicle |
| 193a | Alternative signal 193 MAP sensor | Turbo pressure sensor, PST, www.corsa-inst.com |
| 195 | Barometric pressure signal | Host vehicle |
| 196 | Chill signal line | From switch 243 to controller 215 |
| 197 | Engine coolant temperature signal | Host vehicle |
| 198 | Warm signal line | From switch 243 to controller 215 |
| 199 | Engine oil temperature signal | Host vehicle |
| 201 | Engine oil pressure signal | Host vehicle |
| 203 | Mass airflow (MAF) signal | Host vehicle |
| 205 | Throttle position signal (TPS) | Host vehicle |
| 207 | Vehicle battery voltage signal | Host vehicle |
| 209 | Display connector | RS 232 D sub male AML09K-ND www.digikey.com |
| 210 | Knock present signal | Host vehicle |
| 211 | LCD | Toshiba 6.5" LTA065A041F www.toshiba.com |
| 213 | LCD driver | Toshiba T6965C www.toshiba.com |
| 215 | Display controller | PIC 18LF4620 www.microchip.com |
| 219 | Real time clock | IC counter w/osc. MC74HC4060A www.digikey.com |
| 221 | Display back up battery | 3.0 v lithium coin cell CR2032 |
| 223 | Communication interface controller | AMD 186CC www.amd.com |
| 225 | Input up switch | Momentary press switch SPST CKN1609-ND www.digikey.com |
| 227 | Input select switch | Momentary press switch SPST CKN1609-ND www.digikey.com |
| 229 | Input down switch | Momentary press switch SPST CKN1609-ND www.digikey.com |
| 231 | Enunciator driver | Darlington transistor array 296-16971-5-ND www.digikey.com |
| 233 | Stainless steel fender washer (×2) | #18-8 www.firmlyattached.com |
| 233t | Mounting tabs (×2) | Stainless steel loops |
| 235 | Ceramic washer (×2) | #8 JC2 www.sisweb.com |
| 237 | Stainless steel tie wire | 50 lb Duralast model 50114p www.homedepot.com |
| 239 | Sensor AS mounting hole | #8 mounted to allow sensor AS probe facing exhaust gases in manifold 144m |
| 241 | Power on/off switch | Rocker switch SPDT CKC1244-ND www.digikey.com |
| 243 | Select warm/chill switch | Rocker switch SPST CKN2052-ND www.digikey.com |
| 245 | Operating lamp | LED green 67-1119-ND www.digikey.com |

-continued

| Number | Title | Supplier |
| --- | --- | --- |
| 247 | Test switch | Momentary press switch SPST CKN1609-ND www.digikey.com |
| 249 | Alert lamp | LED red 67-1120-ND www.digikey.com |
| 253 | Gauge bar graph | Right portion of LCD 211 software module Nelson Research www.mchipguru.com |
| 255 | SYStem access connector | USB A receptacle CCUSBA-32001-00X www.cypressindustrial.com |
| 257 | System ready lamp | LED green 67-1119-ND www.digikey.com |
| 259 | Recharge lamp | LED amber 67-1118-ND www.digikey.com |
| 261 | Temperature display area | Upper portion of LCD 211 |
| 263 | Chill Time Available area | Lower portion of LCD 211 |
| AS | Advanced wavefront sensor | First look pulse sensor www.sentech.com |
| R1 | Current driving resistors (×4), LED circuits | 324'Ω .1 w resistor BC324XCT-ND www.digikey.com |
| R2 | Current limiting resistors (×4), momentary press circuits | 10K'Ω .1 w resistor BC10.0KXCT-ND www.digikey.com |
| T1 | Ambient temperature sensor | Thermistor BC 1485-ND www.digikey.com or thermocouple TC-61XKBEX36A www.superlogics.com |
| T2 | Intake temperature sensor | Thermistor BC 1485-ND www.digikey.com or thermocouple TC-61XKBEX36A www.superlogics.com |
| T3 | Exchanger temperature sensor | Thermistor BC 1485-ND www.digikey.com or thermocouple TC-61XKBEX36A www.superlogics.com |
| T4 | Engine intake temperature sensor | Thermistor BC 1485-ND www.digikey.com or thermocouple TC-61XKBEX36A www.superlogics.com |
| T5 | Exhaust temperature sensor | High temp thermocouple (platinum) ANSI type R www.durexindustries.com |

DETAILED DESCRIPTION OF THE INVENTION

Reference will now be made to the drawings wherein like structures will be provided with like reference designations.

Hardware Overview of the Preferred Embodiment

FIG. 1a discloses a block diagram of the SSCFFC with details of the controller 133. The heart of controller 133 is a DSP processor 133p. The processor 133p is a multi-function processor with sensing, processing and controlling capabilities such as a PIC 16F877 from Microchip Technology (www.microchip.com). The processor 133p monitors system components and receives system data inputs, and uses software to combine this information with resident tables from previous operations and host vehicle operating specifications, and executes system control functions. A real time clock 133r provides timing and synchronization capabilities. The controller 133 is housed in rugged plastic enclosure KS 1423 from Rittal company (www.rittal.co.uk). A sensor interface 132 is provided for amplification and conversion of sensor signals T1 through T5. These sensors collect the following data: sensor T1 measures ambient air temperature, sensor T2 measures by-pass air temperature, sensor T3 measures exchanger 128 (FIG. 1c) temperature, returning to FIG. 1a sensor T4 measures output air temperature in combiner 134, sensor T5 measures exhaust air temperature, and sensor AS monitors integrity of combustion gas wavefronts. Returning to FIG. 1a a Fast Fourier Transform (FFT) processor 129i is provided in hardware to minimize time for frequency content analysis from sensor AS to processor 133p. A data cable 129 provides connection of interface 132 to T1 through T5 signals. A boost sensor 193a such as PST from Corsa Instrumentation will provide boost levels on host vehicles without built in boost range on signal 193 (shown in FIG. 1B). Returning to FIG. 1a on cable 129 a quick release pair of connectors 123q (X6) are provided for where box icons are indicated at sensors T1 through T5 and sensor 193a. An advanced sensor AS is positioned to monitor cylinder output. The sensor AS is such as a piezoelectric sensor sandwiched with poly or plyable material and a stainless steel shell to withstand the environment of the exhaust stream gases. Sensor AS is mounted in header 144m (FIG. 5b) to facilitate optimal exhaust gas wavefront exposure. Returning to FIG. 1a sensor AS has a bnc cable connected to controller 133 at connector 129t. The processor 129i can be a DSP or FPGA that runs a Fast Fourier Transform (FFT) or similar frequency content analysis software routine and analyzes the analog signal from sensor AS and transfers these processed data to processor 133p. The processor 133p has a look up table stored in memory with previously quantified signals from engines with anomalies. These anomalies have, but are not limited to conditions where; fuel is contaminated, excessive spark advance, excessive combustion chamber temperature, and no spark. When processor 133p determines that a condition comparable to an anomalous condition is present an alert signal is sent to display 139. On systems equipped with OBD-2 or CAN timing can be retarded or advanced as required. Similar adjustment techniques can be used with intake air conditioning, boost levels, fuel enrichment, and valve timing. The processor 133p is capable of sufficient processing speed to evaluate and determine a cylinder is subject to engine anomaly before that cylinder fires again. By sensing from sensor AS, processing in processor 129i, reporting to processor 133p, reporting to ECU 127, and adjusting spark advance or other values discussed above, potentially catastrophic or problematic conditions will be mitigated or avoided. A coax instrumentation cable 129a connects sensor AS to connector 129b. An operator display 139 provides interface and control. A data interface cable 140 connects display 139 to controller 133. To simplify installation a connector pair is provided at both ends of cable 140. The cable 140 has connector pair 140p at the controller 133 and connector pair 209 at display 139.

A pair of high current PWM drivers are provided for a Thermoelectric device (TED) 107 and expansion for an electric motor 111 driven supercharger. An expansion driver 135 is configured for operation and control of motor 111 over expansion cable 156m. An expansion connector pair 156q is provided for installation and quick release of cable 156m circuitry. When adapting system to existing boosters an electronic boost controller such as an e-Boost from TurboSmart can replace driver 135. A driver 137 is configured for operation and control of TED 107 over a cable 156c. A connector pair 156r is provided for installation and quick release of cable 156c circuitry. The driver 135 consists of drivers such as contained in "Brushless DC Motor Control Made Easy", Ward Brown. The driver 135 receives PWM control signals from processor 133p and instructs motor 111 to the desired rpm and monitors back electromagnetic force (BEEMF) from motor 111. The measured BEMF is compared to the applied voltage and rotor speed and position can be determined. The effective applied voltage can be varied with PWM and the speed of motor 111 by timing the commutation phases. A short software routine in processor 133*p* will handle PWM and commutation and a state table will schedule reading peak applied voltage and BEMF voltages at two times per cycle. The driver 137 receives PWM control signals from processor 133*p* and energizes TED 107 to chill or warm. The sensor T3 monitors exchanger 128 (FIG. 2) temperature and provides this information over sensor cable 129 through connector 129*t*. Processor 133*p* uses sensor T3 information to instruct driver 137 how much effective voltage should be applied to TED 107 by PWM to reach, sustain, or change to affect the temperature of exchanger 128. A fan motor driver 108*d* is provided for control of fan 108. The fan 108 receives power from driver 108*d* through cable 108*c*. Processor 133*p* will activate the fan 108 whenever SSCFFC is on and vehicle speed (FIG. 2*b* signal 189) is below 20 mph. The actuator 123 is connected to controller 133*p* over cable 123*d*. A pair of connectors' 123*c* at actuator 123 facilitates connection and quick release of the actuator circuitry. The buffer 143 distributes power to controller 133 over cable 142. The buffer 143 additionally communicates status and receives instructions over a cable 138. The ECU 127 is connected over a cable 126 (OBD-2 to RS 232 cable from www.nology.com) to processor 133*p* inside controller 133.

Figure 1B:
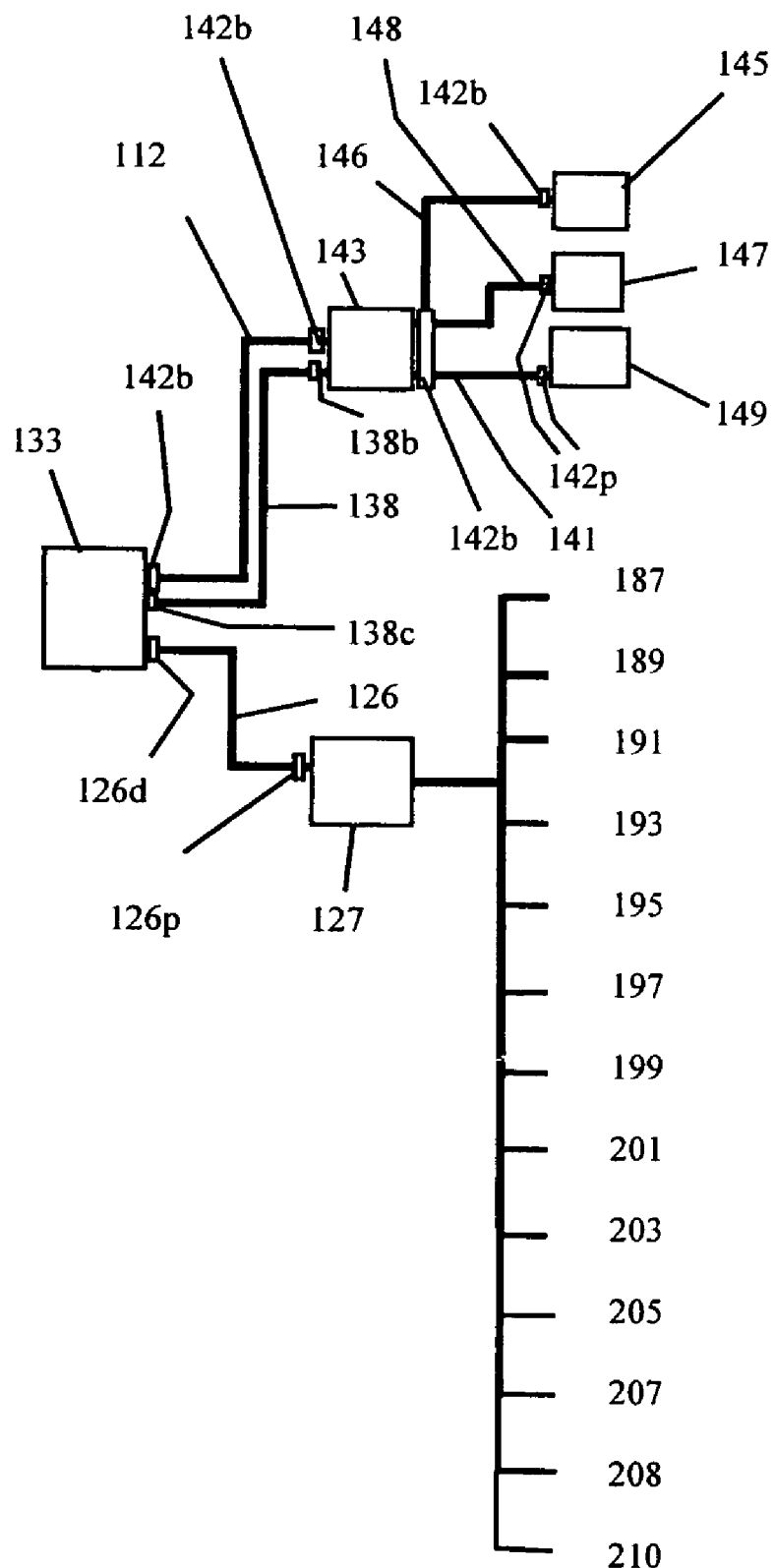
FIG. 1b shows a block diagram of the SSCFFC power and host interface
Figure 2A:
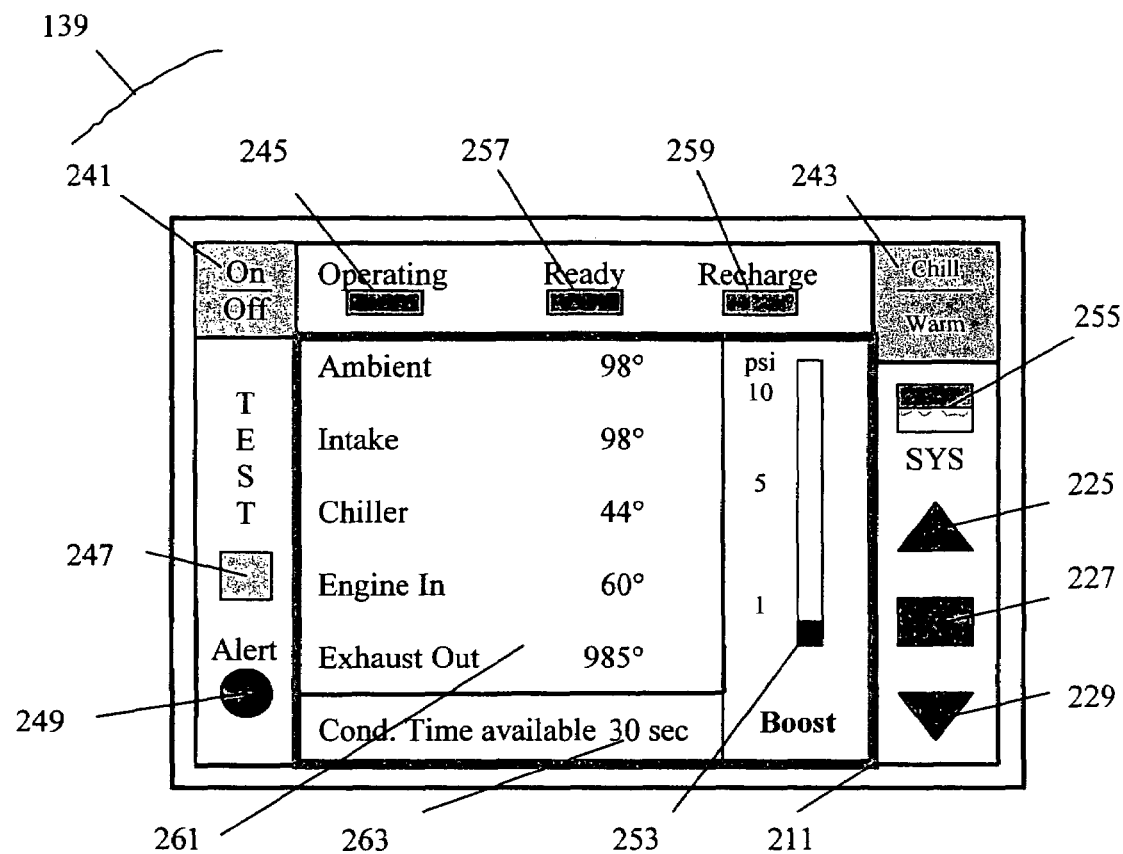
FIG. 2a shows a screen shot of the display portion of the SSCFFC system.

FIG. 1*b* shows a block diagram of the SSCFFC power and host interface. The controller 133 connects over cable 126 to ECU 127 and critical inputs from host system. A signal 187 provides engine crankshaft position. A signal 189 supplies vehicle speed. A signal 191 provides engine RPM. A signal 193 provides manifold air pressure (MAP). An alternative MAP sensor may be necessary on some vehicles. Controller 133 to determine host engine's intake vacuum and boost conditions monitors the signal 193. A signal 195 provides barometric pressure. A signal 197 provides engine coolant temperature. A signal 199 provides engine oil temperature. A signal 201 provides engine oil pressure. A signal 203 provides mass airflow (MAF). A signal 205 measures throttle position (s) (TPS). A signal 207 measures battery voltage. A signal 208 indicates on/start information. A signal 210 provides knock detected. A connector 126*p* connects cable 126 to ECU 127. A connector 126*d* connects cable 126 to controller 133. The controller 133 collects and monitors these incoming data signals and compares and tracks values of demand (signal 205) to the stored values in system memory. The controller 133 will evaluate system status and control the system state to implement demand by driver as sensed by signal 205. Additionally, the controller 133 additionally connects to buffer 143 over cable 142 for power and a cable 138 for data. A connector 138*b* connects cable 138 to buffer 143. A connector 138*c* connects cable 138 to controller 133. The buffer 143 can receive power from auxiliary power 145 over a cable 146. A connector 142*b* connects cable 146 to power 145. A connector 142*b* connects cable 142 to controller 133 and buffer 143. The power 145 can be any source of storage sufficient to supplement primary system power for TED 107 and fan 108 when system power must be devoted to non-conditioner 101 high demand situations such as engine starting. A typical power 145 is compatible with 42v standards (ISO 21848) or any efficient storage system that buffer 143 can utilize while maintaining compatibility with host system power parameters. A host vehicle alternator 147 is shown for recharging storage power 145 under supervision of controller 133 over cable 148 through buffer 143. A connector 142*p* connects cable 148 to alternator 147. The buffer 143 supplies a voltage step up to recharge power 145. A host vehicle battery 149 is shown connected to buffer 143 over a cable 141. A connector 142*p* connects cable 141 to battery 149. Power cables 146, 148 and 141 are connected to buffer 143 at a terminal connector 142*b*. The battery 149 can be 12 volt to 42 volt with proper configuring of buffer 143. The buffer 143 will monitor voltage levels for vehicle battery 149, alternator 147, and auxiliary power 145. The buffer 143 will supervise recharging and level conditions and inform controller 133 and operator display 139 (FIG. 2*a*). A system can be configured without power 145 where controller 133 sequences power drain applications during high demand periods. Although batteries and voltage levels are discussed fuel cells or capacitors such as Ultracapacitor from Maxwell or similar storage device are appropriate to provide power for SSCFFC applications.

Figure 1C:
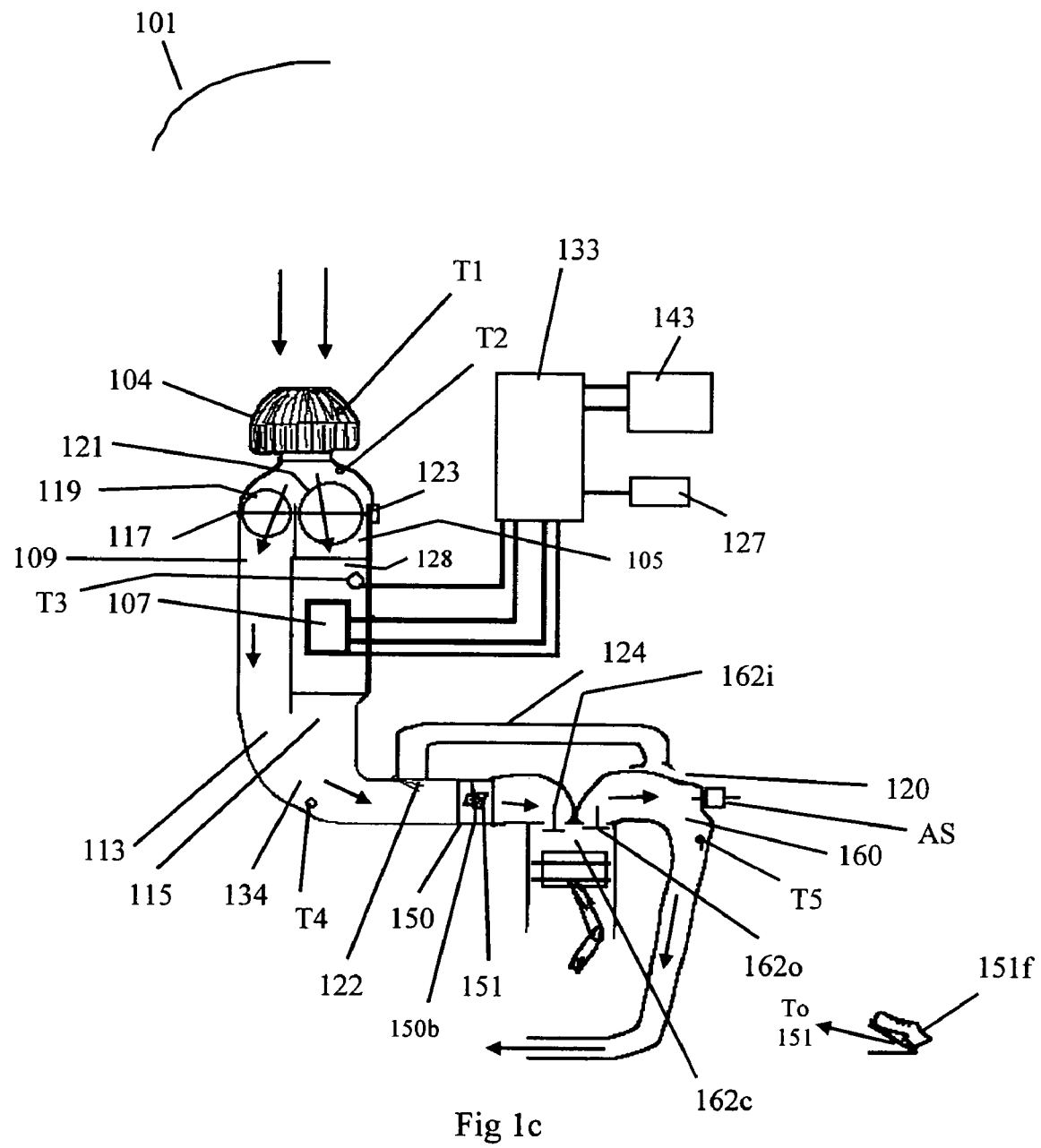
FIG. 1c shows a function flow diagram of the SSCFFC system

FIG. 1*c* is a functional side view of the SSCFFC controller installed with a conditioner. Lines with arrows depict airflow through conditioner 101. A booster is not shown in this drawing for brevity, if a booster is included it would insert inline with housing 105 just before or after exchanger 128; in outlet 115 air stream. An air cleaner 104 filters incoming air. A temperature probe T1 measures the temperature of incoming air. A by-pass 109 normally (when a high load demand is not present) routes air directly from a butterfly valve plate 119 and an exiting outlet 113. A second temperature probe T2 measures the intake temperature of the air ahead of valves. During normal operation actuator 123 positions a shaft 117 to open valve plate 119 and close a butterfly valve plate 121 so incoming air proceeds through outlet 113 into a combiner 134. A temperature probe T4 measures the temperature of the engine intake air continuing through combiner 134. The combiner 134 during normal operation experiences engine vacuum that will pull air into a throttle body 150 and around an intake valve 162*i* into the engines combustion chamber 162*c*. Following combustion in chamber 162*c* exhaust gases exit through exhaust valve 162*o* and out an exhaust pipe 160. A high temperature sensor T5 measures the temperature of the exiting exhaust gases in an exhaust pipe 160. Also in pipe 160 is sensor AS that senses the pressure changes in exhaust gas wave front. Within a typical modern engine management system/a wide-open throttle (WOT) condition (throttle actuated by driver beyond 85%) is sensed by such as a throttle position sensor (TPS) 151 when a driver presses the accelerator pedal 151*f* beyond 85%. This demand is transmitted by cable, wirelessly, or similarly to a coupling that actuates a butterfly valve 150*b* of body 150. The controller 133 monitors host signals from (ECU) 127. The controller 133 is powered by power buffer 143. The controller 133 energizes TED 107 and conditions exchanger 128 on pre-start cycle. The controller 133 monitors exchanger 128 temperatures with sensor T3. When controller 133 senses WOT true from ECU 127, all critical engine parameters are checked and when no abnormal parameters are present, processor 133 commands actuator 123 to rotate shaft 117 to open plate 121 and close plate 119. This action closes by-pass 109 and opens airflow through housing 105 and outlet 115. The controller 133 having already conditioned exchanger 128 will turn off TED 107 to minimize current draw during this high demand condition. (If auxiliary power source is present 133 will not turn off TED 107 allowing continued conditioning of exchanger 128). While flowing through exchanger 128 air is conditioned. The controller 133 monitors sensor T3 to determine current needs of TED 107 to condition exchanger 128. Conditioned air continues through outlet 115 into combiner 134. The sensor T4 monitors the temperature of air flowing through combiner 134. The boosted and chilled air continues through throttle body 150 (wide open) past valve 162*i* and into chamber 162*c* for combustion. This boosted and conditioned air is combusted in chamber 162*c* and exhaust exits past valve 162*o*.

These exhaust gases are expelled through pipe 160 where temperature is monitored by sensor T5 and combustion wave front is sensed by sensor AS. The Controller 133 will check WOT signal ten times a second or more. When WOT signal is no longer true or time out occurs in typically 30 seconds, controller 133 will command actuator 123 to rotate shaft 117 to close plate 121 and open plate 119.

Warm start up and operation (cold cycle) air is available when sensor T1 tells controller 133 that ambient air is below 50° F. and ECU 127 registers engine temperature below normal operating temperature (typically 170° F.). During cold cycle, controller 133 commands TED 107 to warm exchanger 128 to 64° F. When start cycle is initiated, controller 133 turns off TED 107 to minimize power drain during this high demand situation. If auxiliary power is present 133 commands TED 107 to continue warming conditioner 128. Absent auxiliary power, 133 will command TED 107 to suspend warming conditioner 128 to minimize current drain during cold start. The Controller 133 will command actuator 123 to position shaft 117 to close plate 1119 and open plate 121 to allow flow through housing 105. The exchanger 128 having been pre-heated warms air as it flows through exchanger 128. Warmed air will continue through plate 121 (open) through combiner 134 and into engine through body 150, and into a normal combustion cycle. Once start of engine has been accomplished, controller 133 will re-enable TED 107 to keep air supply warm until sensor T5 reaches threshold (typically ~100° F.) temperature. Then Controller 133 will shut down TED 107 and command actuator 123 to position shaft 117 for normal operation with plate 119 open and plate 121 closed so that air flows through bypass 109 and into combiner 134. Additionally, when ECU 127 senses normal operation temperature thermal flap valve 122 that is normally closed will open. The valve 122 when open will allow warm air from pipe 160 to enter warm air tube 124 at inlet 120 and assist in engine warming. This condition can continue until engine normal operational temperature (typically ~170° F. (coolant signal 197)) is reached and valve 122 is closed. An engine with this configuration in a cold climate will experience warm air through out cold start and operation cycle. This "conditioned" air will minimize start time and improve completeness of combustion during initial cold operation thereby reducing emissions. In addition to reduced emissions and improved fuel economy, engine wear is reduced. Cold start is the most vulnerable time for an engine as fuel that is not combusted can foul lubrication oil causing chemical breakdown and scratching of moving parts. Cold start conditions therefore typically contribute to premature engine wear and failure.

FIG. 2a discloses a display 139 for monitoring and controlling this embodiment of the SSCFFC. A rocker switch 241 provides power on and off function. Rocker switch 243 allows operator selection of warm or chill modes. Momentary press switch 247 initiates test functions. During test mode system will read all sensors and perform operability tests. Successful test results will flash a ready indicator lamp 257 to inform operator of confirmed operational status. If any problems are incurred an alert lamp 249 (red) will flash. During operation lamp 249 will also flash if oil temperature or pressure (signal 199 and signal 201, both FIG. 1b) are out of safe operational range. Additionally, lamp 249 will flash if sensor AS (FIG. 1c) detects abnormal combustion. The display 139 consists of an LCD 211 surrounded by a perimeter of inputs and outputs. Returning to FIG. 2 the LCD 211 is an alpha numeric with graphics display. A temperature display area 261 displays temperatures T1 through T5 with numerical values that are constantly updated during operation. An area 263 below area 261 displays a value for "Cond. Time Available" to the right in seconds. The numerical value displayed in area 261 is generated by processor 133p (FIG. 1a) and updated constantly during operation. Returning to FIG. 2 to the right of areas 261 and 263 is a bar graph 253 for expansion to applications with superchargers and displays current boost level. The graph 253 comes from a software package module from Nelson Research that is compiled into run time environment and loaded into display processor. The ready indicator lamp 257 (green) will illuminate (steady illumination) when SSCFFC is ready for conditioning operation. An operating lamp 245 will glow a steady green when system is operating. A recharge indicator lamp 259 (amber) will illuminate when SSCFFC is recharging and not ready for conditioning operation. A system interface connector 255 (USB connector) labeled SYS(tem). The connector 255 allows operator data interface and bi-directional loading of SSCFFC system. Operator selection and entry are provided by input select switch 227, input up switch 225, and input down switch 229.

Figure 2B:
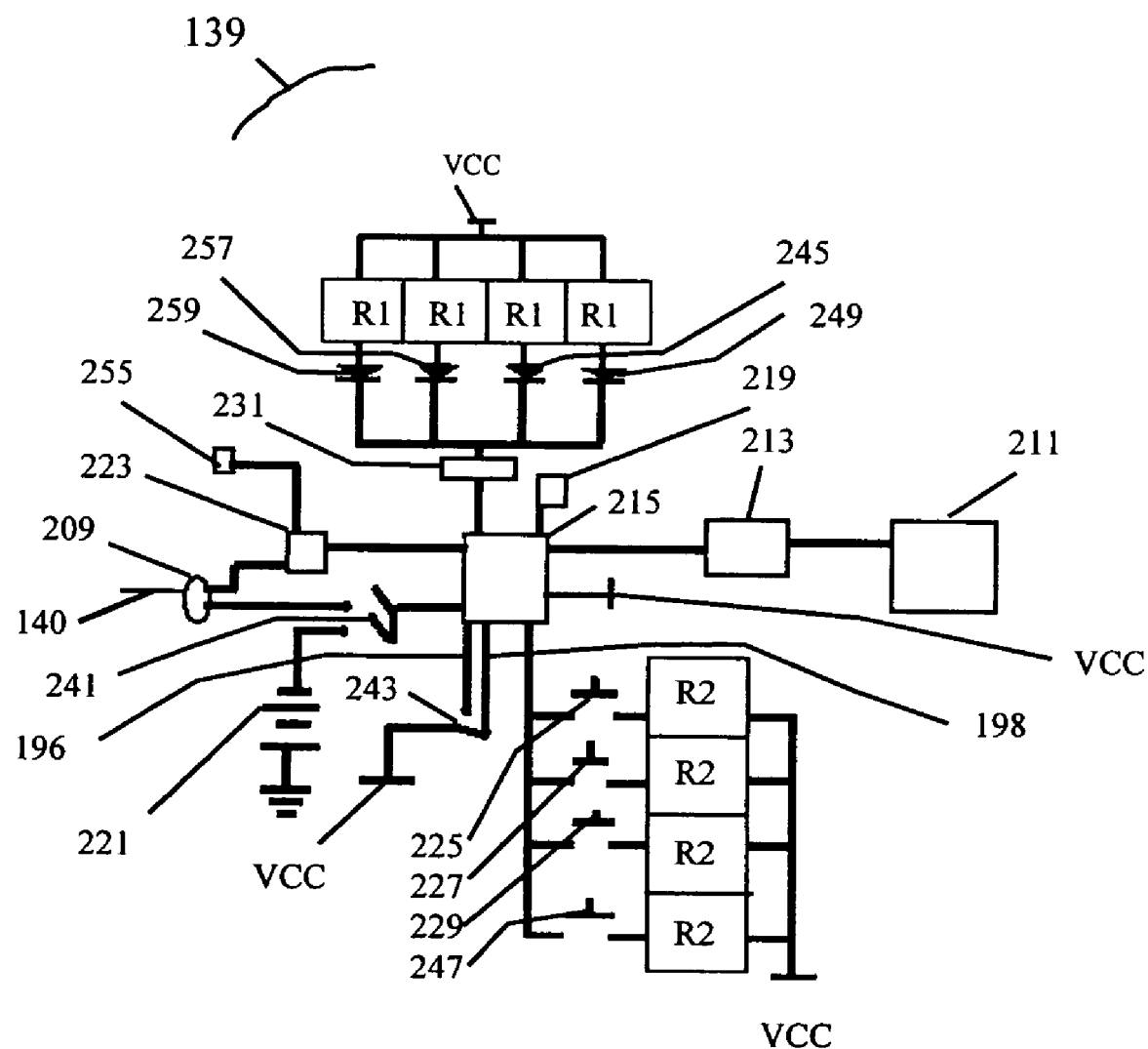
FIG. 2b shows a block diagram of the display portion of the SSCFFC system.

FIG. 2b discloses a block diagram of display 139 functions. The switch 241 is shown with double poles to enable system power (VCC) from cable 140 through connector 209 or back up battery 221. The switch 243 to reflect operator selection is shown selecting either a chill signal line 196 or a warm signal line 198 from VCC to a display controller 215. The cable 140 through connector 209 also connects to communications interface controller 223. The controller 223 will receive and transmit data and signals to controller 215 from controller 133 (FIG. 1a) over cable 140 and external data over connector 255. An enunciator driver 231 is provided to drive display lamps (LEDs). A collection of current driving resistors R1 is provided for individually enabling lamps when energized by controller 215 through driver 231. When energized lamp 257 will glow to indicate a system Ready. When energized lamp 259 will glow to indicate a system recharge is occurring. When energized lamp 245 will glow indicating that system is operating normally. When energized lamp 249 will glow indicating a system alert and action is required.

A real time clock 219 is provided to assure systems ability to synchronize and interoperate with other processors and systems. The display 211 is shown with a LCD driver 213 that receives information from controller 215. A power tap VCC is shown for power distribution availability. A collection of current limiting resistors R2 is provided to signal controller 215 that operator has a request. When switch 225 is pressed VCC will be sent to controller 215 to request that an up in value presently displayed be implemented. For example, if system is being updated an operator could increase a time or day function to initialize operating parameters. When switch 227 is pressed VCC will be sent to controller 215 to request that present values are entered. For example, if system values are correct operator will enter them by pressing switch 227. When switch 229 is pressed VCC will be sent to controller 215 to request that a down in value presently displayed be implemented. For example, if system is being updated an operator could decrease a time or day function to initialize operating parameters. When switch 247 is pressed VCC will be sent to controller 215 to initiate a test of SSCFFC functions.

Figure 3A:
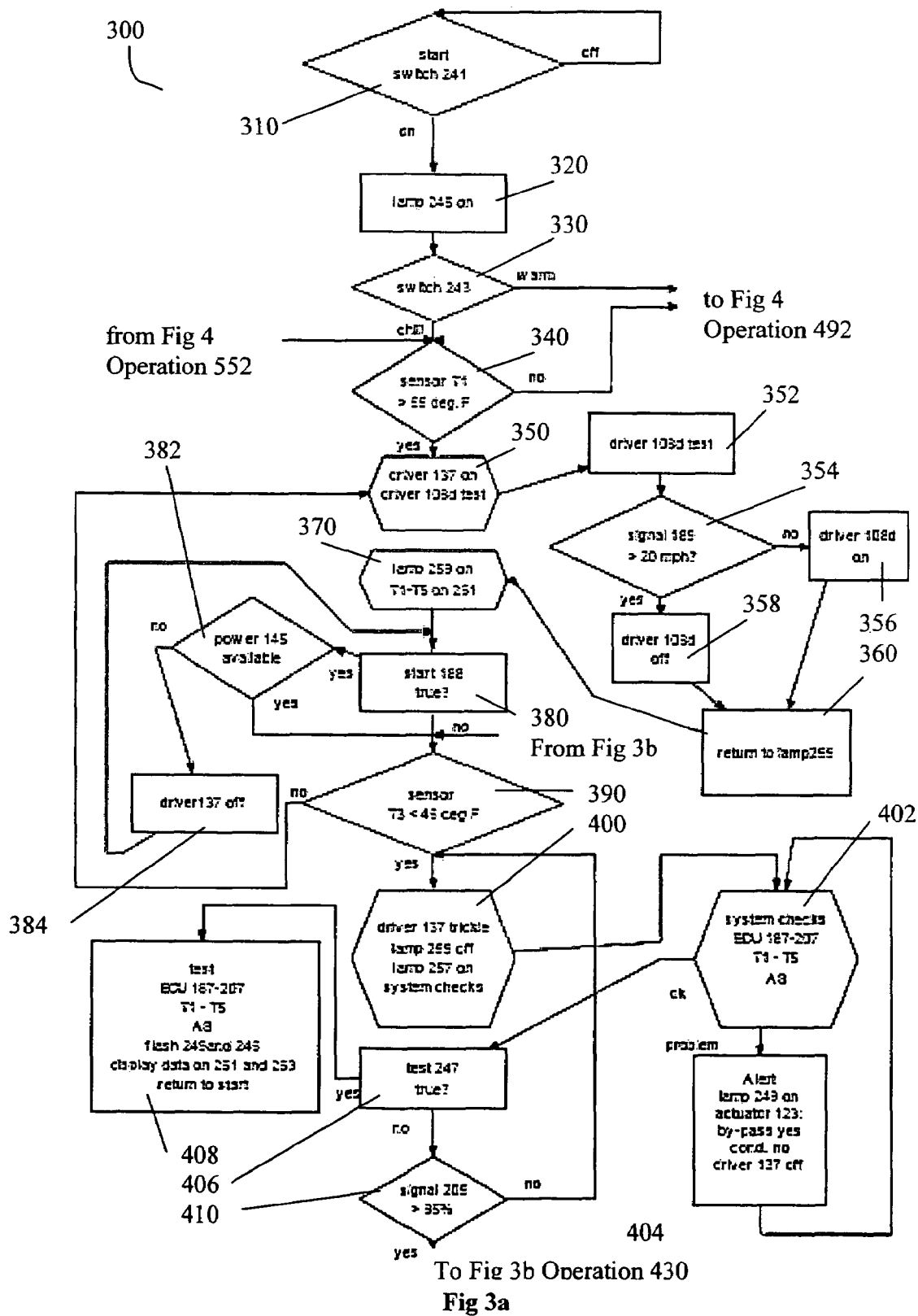
FIG. 3a shows the logic flow of the chill operation mode of the SSCFFC system.

FIG. 3a discloses an example program logic flow diagram operation 300 for control of "chill" conditioning mode of operation of my SSCFFC invention. Operation 310 with system switch 241 selected On operation 320 will enable lamp 245 to signal operator that system is turned on. Operation 330 has switch 243 checked for mode selection. If switch 243 has warm selected program will go to FIG. 4 operation 492. If switch 243 has chill selected program will continue to operation 340 and check sensor T1. If sensor T1 reads an ambient temperature below 55° F. program will go to FIG. 4 operation 492. If sensor T1 reads an ambient temperature at or above 55° F. operation 350 controller 133 will energize driver 137, next operation 352 will perform driver 108*d* test. Following operation 352 operation 354 driver 108*d* test if vehicle speed is above 20 miles per hour (mph), yes operation 358, fan 108 is not required and driver 108*d* will not be turned on. If vehicle speed is at or below 20 mph no operation 356 will turn driver 108*d* on. When program completes driver 108*d* next operation 360 test lamp 259 is turned on. Following to operation 370 all temperatures T1 through T5 are checked and values displayed on area 261 of display 139 (FIG. 2*a*). Next is operation 380 checking for start true. If yes proceed to operation 382 where a test for power 145 is made. If power 145 is available proceed to operation 390 if not proceed to operation 384 and turn off driver 137. Returning to operation 390, when sensor T3 reports at or below 45° the processor 133 will proceed to operation 400 and command driver 137 and 108*d* with PWM to trickle, that is to supply sufficient PWM current to maintain cold storage for next demand operation. Additionally, lamp 259 will be extinguished and lamp 257 will be turned on to indicate system readiness. Next is operation 402 for all system functions from ECU 127 are checked. All temperatures T1 through T5 are checked and values displayed on area 261. The sensor AS data are checked. If processor 133 compares current data to stored data for similar operational conditions and determines any out of range temperatures or undesirable frequency content are present processor will proceed to operation 404 and alert lamp 249 will be illuminated, actuator 123 will close conditioner and open by-pass and turn off driver 137. Additional actions may include sending information to ECU 127 to retard timing, increases fuel supply, adjust valve timing or lower boost (if present). The monitoring of critical parameter signals and comparing by controller 133 facilitates smart engine adjustments that will prevent engine damage. Program will cycle back to operation 402 for system checks until parameters are normal. When all system parameters indicate normal (ok) program will proceed to operation 406 look for an operator initiated test (switch 247 on FIG. 2*a*). If test 247 is true processor proceeds to operation 408 where all system parameters will be examined including signals from ECU 187 through 207, sensors T1 through T5, sensor AS, also flash lamps 249 and 245, and display these data on 261 and 263. When these operations are complete program will return to operation 310 start node. If test 247 is not true program will proceed to operation 410 to check signal 205 for percentage actuation of throttle pedal. If greater than 85% actuation (WOT) is detected from host high demand mode will initiate. If less than 85% actuation is detected from host normal operation will cycle to operation 400 and program will return to keep system ready for demand operation.

Figure 3B:
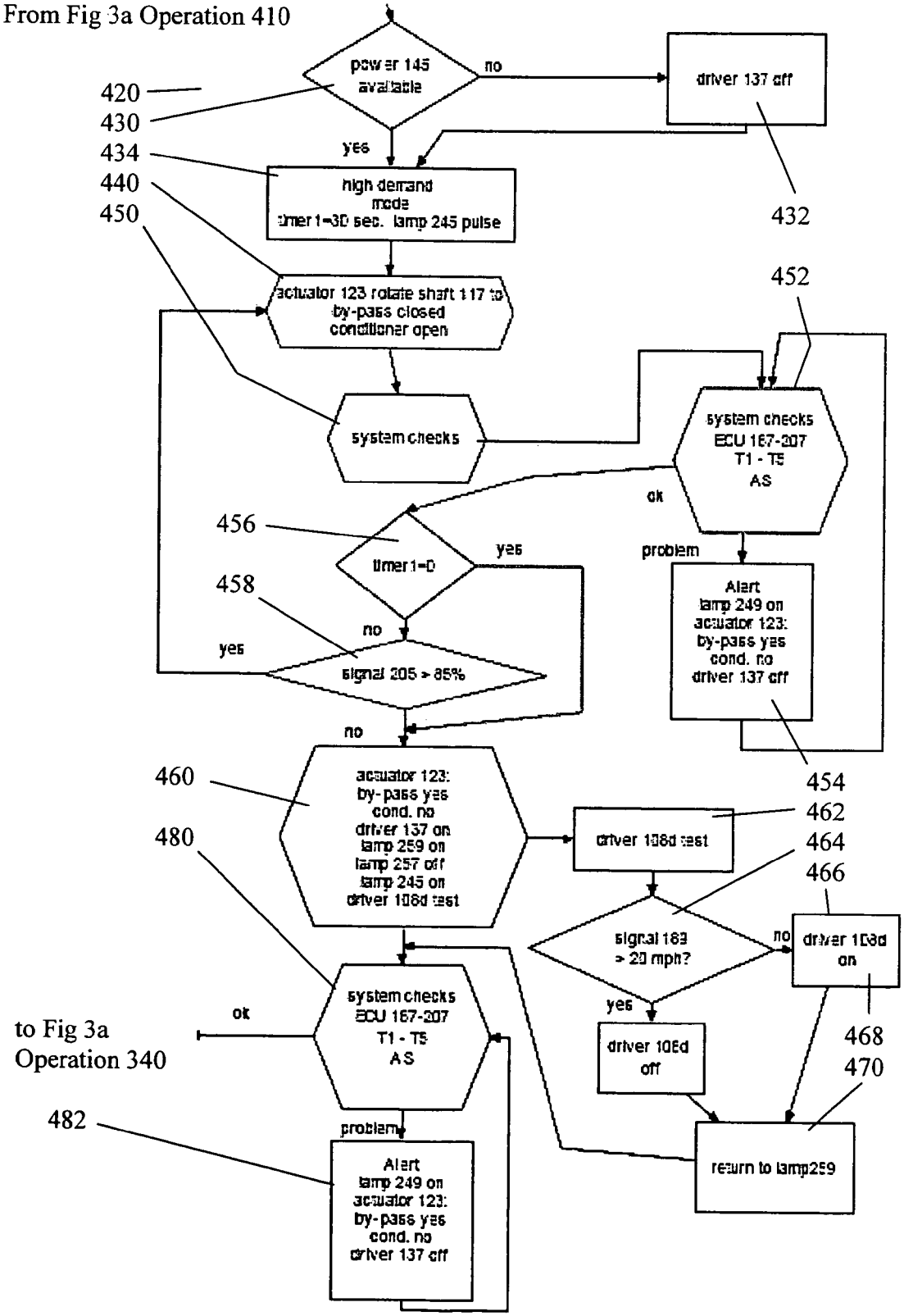
FIG. 3b shows a continuation of the logic flow of the chill operation mode of the SSCFFC system.

FIG. 3*b* logic diagram 420 continues from FIG. 3*a* in high demand mode. The first step is operation 430 in high demand mode is to check for power 145 availability. If power 145 is not present system is operating on host power and operation 432 where driver 137 is turned off to reduce power drain on host during high demand. If power 145 is present, system has reserve and at operation 434 timer1 is set to up to 30 seconds (depending on reserve power availability). Depending on system requirements and capabilities this number can be adjusted by operator through front panel (FIG. 2*a*, using switches 225, 227 and 229) or by loading program into port 255. Lamp 245 will pulse during high demand mode. Returning to FIG. 3*b* operation 440 will next command actuator 123 to rotate shaft 117 to close by-pass and open conditioner. Incoming air will now be conditioned before it enters engine. Next operation 450 where System checks will be performed at each cycle to assure engine integrity and monitor for problems. Operation 452 details system checks for all system functions from ECU 127. All temperatures T1 through T5 are checked and values displayed on area 261. The sensor AS data are checked. If processor 133 compares current data to stored data for similar operational conditions and determines any out of range temperatures or undesirable frequency content are present in the exhaust, processor proceeds to operation 454 where alert lamp 249 will be illuminated, actuator 123 will close conditioner and open by-pass and turn off driver 137. If system checks are ok, processor will proceed to operation 456 to check timer 1 for zero time remaining. If timer1 is equal to zero if yes program will proceed to operation 460 to cease conditioning. If timer1 is not equal to zero program will proceed to operation 458 check signal 205 for greater then 85% actuation. If signal 205 is still greater than 85% actuation program will continue conditioning operation and return to operation 440. If signal 205 is no longer greater than 85% program will cease conditioning process. Operation 460 will halt conditioning actuator 123 will select by-pass and exclude conditioning, driver 137 is turned on to re-condition exchanger 128 for next high demand mode readiness, lamp 259 is turned on, lamp 257 is extinguished, lamp 245 is turned on (not flashing). Operation 462 will test for the necessity of driver 108*d* again. During driver 108*d* operation 464 determines if vehicle speed is above 20 miles per hour (mph) (from ECU 127 signal 189) fan 108 is not required if vehicle speed is indicated to be over 20 mph and operation 468 assures driver 108*d* will not be turned on. If signal 189 indicates speed under 20 mph driver 108*d* will be turned on in operation 466. With fan decisions completed processor goes to operation 470 to return to operation 480. Operation 480 will perform all system checks for ECU 187 through 207. All temperatures T1 through T5 are checked and values displayed on display area 261. The sensor AS data are checked. Processor 133 compares current data to stored data for similar operational conditions and determines any out of range temperatures or undesirable frequency content are present. If so, in operation 482 alert lamp 249 will be illuminated, actuator 123 will close conditioner, open by-pass, and turn off driver 137. Additional actions may include sending information to ECU 127 to for example retard timing, increase fuel supply, adjust valve timing or lower boost (if present). Operation 482 will loop with operation 480 to monitor of critical parameter signals and comparison with proper ranges facilitates smart engine adjustments that will prevent engine damage. Program will cycle to system checks until all parameters are normal. When all system parameters indicate normal (ok) program will return to FIG. 3*a* operation 340. If processor 133 compares current data to stored data for similar operational conditions and determines any out of range temperatures or undesirable frequency content are present if so alert lamp 249 will be illuminated, actuator 123 will close conditioner and open by-pass and turn off driver 137. Additional actions may include sending information to ECU 127 to retard timing, increases fuel supply, adjust valve timing or lower boost (if present). The monitoring of critical parameter signals and comparing facilitates smart engine adjustments that will prevent engine damage. Program will cycle to system checks until all parameters are normal.

Figure 4:
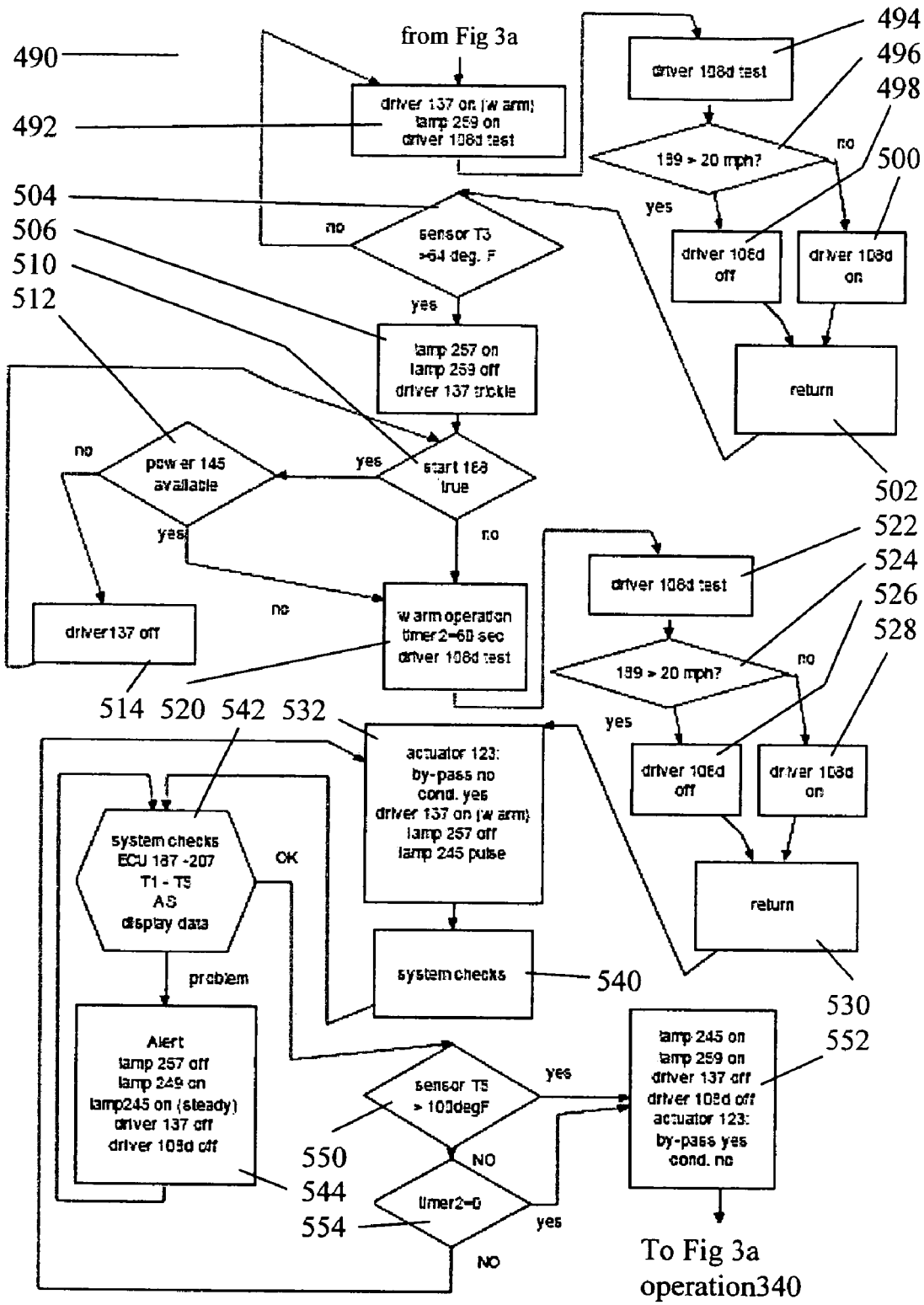
FIG. 4 shows the logic flow of the warmer operation mode of the SSCFFC system.

FIG. 4 discloses an example logic flow diagram 490 for control of warmer operation of the SSCFFC invention. This mode of operation is useful for cold weather starts when engine and air temperatures are too low for complete combustion. Warm mode is entered as described on FIG. 3*a* at operation 492 upon sensor temperature check or with operator switch selection. When switch 243 selecting warm and/or ambient temperature below 55° F., driver 137 is turned on to warm by controller 133 and at operation 494 driver 108d test is initiated. During driver 108d test program at operation 496 it is determined if vehicle speed is above 20 miles per hour (mph) (from ECU 127 signal 189). Fan 108 is not required if vehicle speed is indicated to be over 20 mph and operation 498 driver 108d will not be turned on. If signal 189 indicates speed at or below 20 mph at operation 500 driver 108d will be turned on. With driver 108d operation determined operation 502 will return and routine will next check with operation 504 to see if sensor T3 has exceeded 80° F. If T3 is at or below 80° F., program will cycle back to operation 492 on (warm) to increase T3 temperature. The program will continue warming until T3 temperature is above 80° F. when the program determines yes operation 506 initiates ready status for warm mode. Lamp 257 is turned on, lamp 259 is turned off, and driver 137 is kept warm with a trickle current (PWM power) from driver 137. Operation 510 will next check to see if start has been initiated. When start is detected operation 512 checks for presence of power 145. If power 145 is present program will proceed to operation 520 for warm operation. If power 145 is not available operation 514 will turn driver 137 off to minimize loading of host power during high demand. Operation 514 will continue to check through operation 510 for start status if power 145 is not available. When start is complete or not present operation 520 will continue warm operation mode. Timer2 (warm cycle timer) will be set to 60 seconds and to operation 522 where driver 108d test will be performed. Driver 108d test routine determines if vehicle speed is above 20 miles per hour (mph) (from ECU 127 signal 189). If so, fan 108 is not required. If vehicle speed is indicated to be over 20 mph, with operation 526 driver 108d will not be turned on. If signal 189 indicates speed at or below 20 mph with operation 528 driver 108d will be turned on. With driver 108d operational, condition determined operation 530 will return to operation 532 to continue warm operation mode with actuator 123 enabling air flow through conditioner and closing by-pass. Driver 137 will continue on in warm mode, lamp 257 will extinguish, lamp 245 will pulse. Operation 540 will next perform system checks. During warm operation mode, system checks are detailed in operation 542 are limited to displaying status as high demand is not intended while system is cold (cold oil will not properly lubricate engine). During system checks all system functions from ECU 127 are checked. All temperatures T1 through T5 are checked and values displayed on area 261. The sensor AS data are checked. If system checks are ok program will proceed to check if exhaust temperature sensor T5>100° F. If a problem is incurred with operation 544 an alert will follow. During alert lamp 257 is extinguished, lamp 245 is on (steady), and lamp 249 is turned on. Drivers 137 and 108d are turned off and program will cycle through system checks until problem is resolved. When system checks ok operation 550 checks; is present sensor T5>100° F. exhaust warmer can take over if yes operation 552 will perform the following; and lamp 245 is on, lamp 259 is on, driver 137 is off, driver 108 is off, and actuator 123 open by-pass and closes conditioner. When sensor T5 is not greater then 100° F. program will proceed to operation 554 and continue warm operation mode and check timer2 equal to zero. When timer2 is equal to zero exhaust warmer can take over and operation 552 performs the following; and lamp 245 is on, lamp 259 is on, driver 137 is off, driver 108 is off, and actuator 123 opens by-pass and closes conditioner. Depending on system requirements and capabilities this number (timer2=60 sec) can be adjusted by operator through front panel (using switches 225, 227 and 229) or by loading alternative program into port 255. When timer2 is greater then zero program will proceed to operation 532 and continue warm operation mode and cycle back to actuator 123: by-pass no. When program has completed actions for host to continue warm operation mode (T5>100° F. or timer2=0) program will cycle to FIG. 3a operation 340 and continue operation.

Figure 5A:
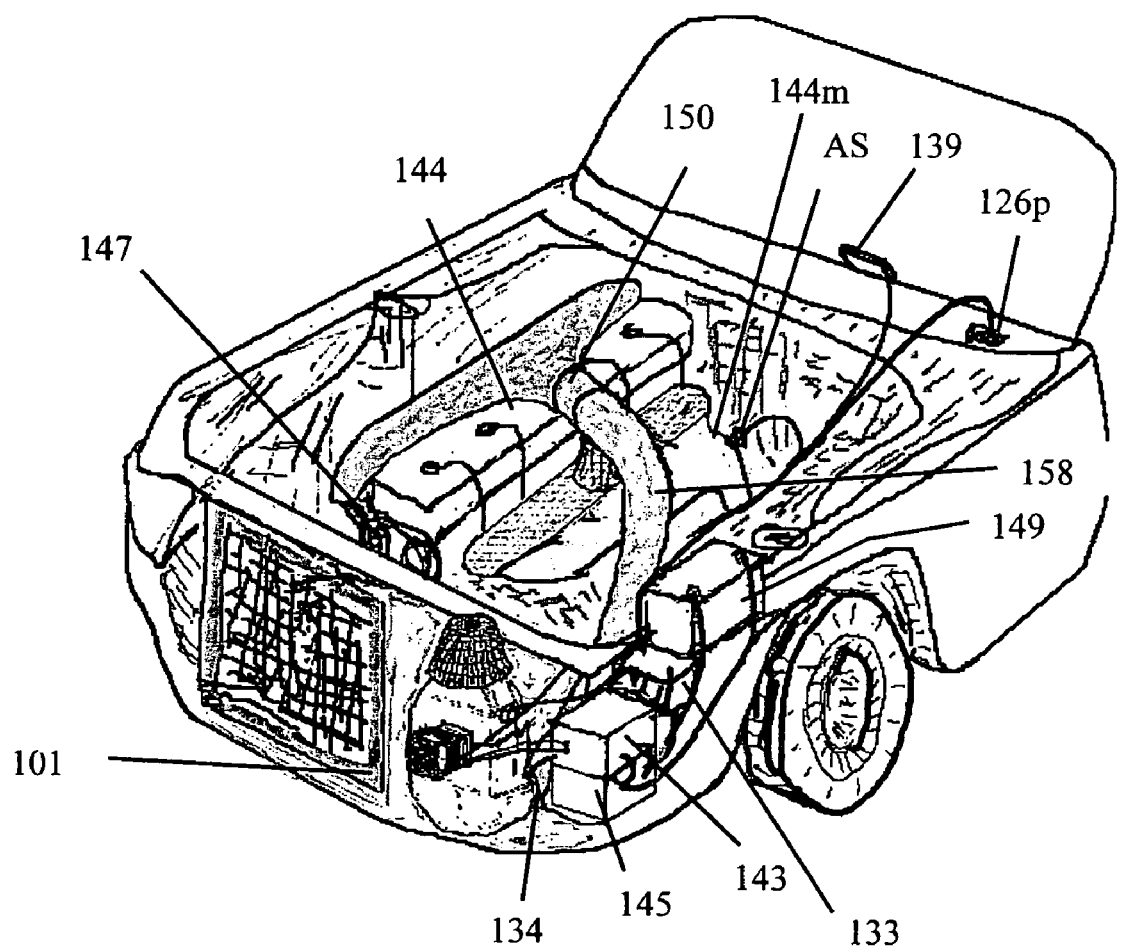
FIG. 5a shows an SSCFFC attached to a host vehicle with a flowing fluid conditioner.

FIG. 5a is a perspective frontal view of the preferred embodiment of my invention, the conditioner 101 mounted in a host vehicle. The conditioner 101 is shown mounted next to the vehicle's radiator, in front of the vehicles firewall. This area of mounting conditioner 101 avoids heat soak disadvantages when compared to mounting conditioner 101 in an engine compartment behind firewall. Components of the system are shown in FIG. 5a for system perspective. The conditioner 101 has an output 134 shown connected with an inlet hose 158 to a host vehicle engine 144 at a throttle body 150. The vehicle has an exhaust manifold 144m that is shown with an advanced sensor AS attached. A vehicle battery 149, an alternator 147, an engine control unit (ECU) connector 126p, and display 139 are shown for descriptive purposes. Also shown are a controller 133 for conditioner 101, a power buffer 143, and an auxiliary power 145.

Figure 5B:
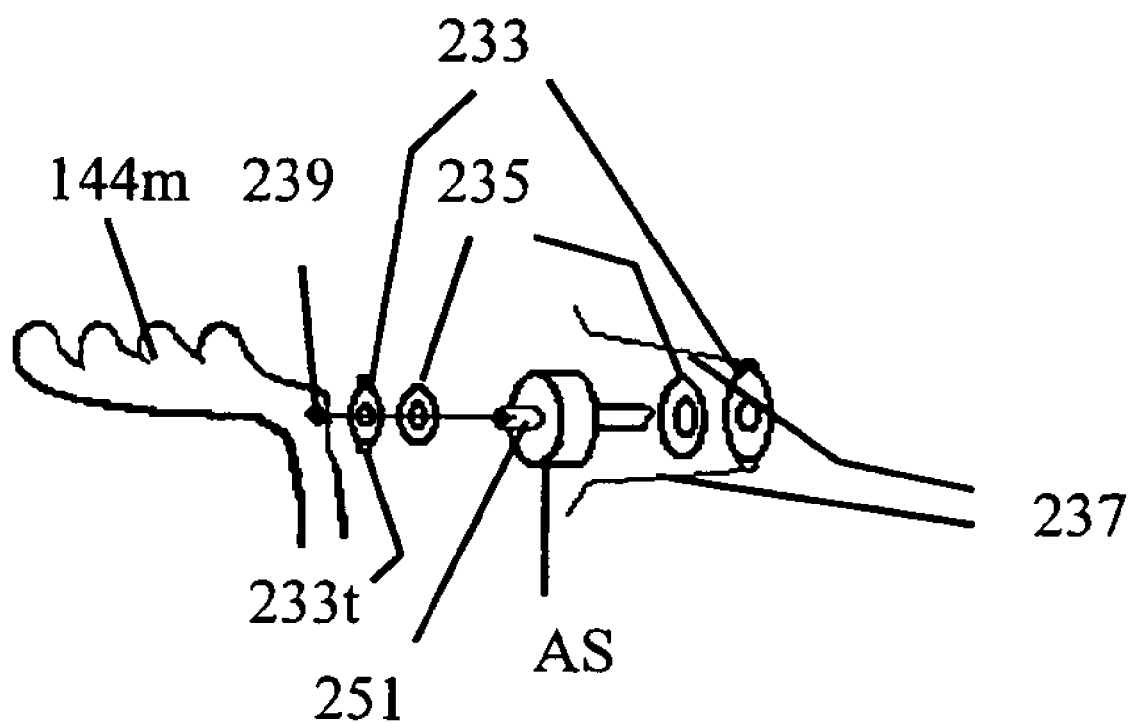
FIG. 5b shows the details for mounting an Advanced Sensor.

FIG. 5b is a blow up of mounting sensor AS. The manifold 144m has a hole 239 for mounting sensor AS. The hole 239 is positioned on manifold 144m so a probe 251 on sensor AS can directly measure wavefronts of exhaust gases. Mounting sensor AS in a curve in the manifold 144m allows direct wavefront exposure to minimize reflections and resulting noise. An adapter or supplemental machining may be required to establish a flat surface around hole 239 to enable sealing between manifold 144m and sensor AS mounting. A steel washer 233 (X2) with tab 233t (X2) on both sides are provided. The tabs 233t can be fashioned by welding (heliarc) #12 gauge stainless steel wire to the sides of washer 233. Tabs 233t should be close enough to edge of washer 233 to allow an insulating ceramic washer 235 (X2) to seat undisturbed. Tabs 233t should be large enough to accommodate a stainless steel tie wire 237 to be threaded through and secured as with aviation tie downs or racing nuts. The wire 237 should exert enough tension with equal pressure on both sides of washer 233 to seal sensor AS to manifold 144m. The Sensor AS is a sandwich disc comprised of a crystal piezoelectric transducer with a cover of material such as stainless steel. The Sensor AS is sandwiched in a protective compressible polymer such as silicone or urethane. The sensor AS such as First Look sensor from Senx Technologies is of sufficient bandwidth to capture the characteristic frequencies on the leading edge of the engine's combustion gas waves.

Figure 5C:
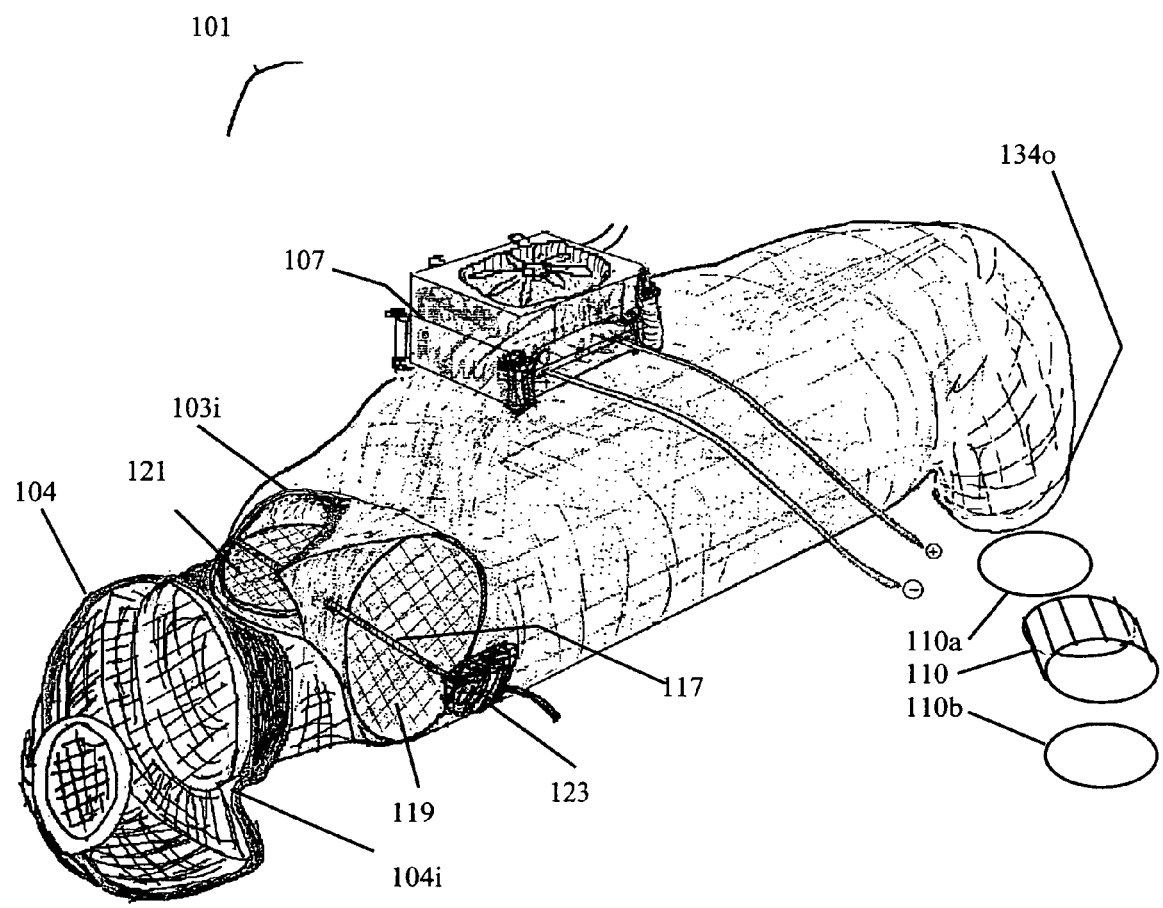
FIG. 5c shows a cut away of a flowing fluid conditioner for control by SSCFFC system.

FIG. 5c discloses a candidate conditioner 101 for control by SSCFFC. In this embodiment air is brought into conditioner 101 through cleaner 104. The cleaner 104 features an opening to view air inlet 104i. A cut away view port 103i is provided in the conditioner 101 body to view the valve mechanism. A double wall insulation configuration is shown at 103i. The actuator 123 determines whether the air will route through valve 121 into conditioner or valve 119 through by-pass by rotating shaft 117. The TED 107 is shown positioned over conditioning chamber. The airflow exits conditioner 101 through combiner and outlet 134o. The outlet 134o can be connected to engine input or accessory device with reinforced silicon hose 110 or similar adapter and hose clamp 110a and hose clamp 110b. The conditioner 101 can be mounted as shown in FIG. 5a.

Figure 6:
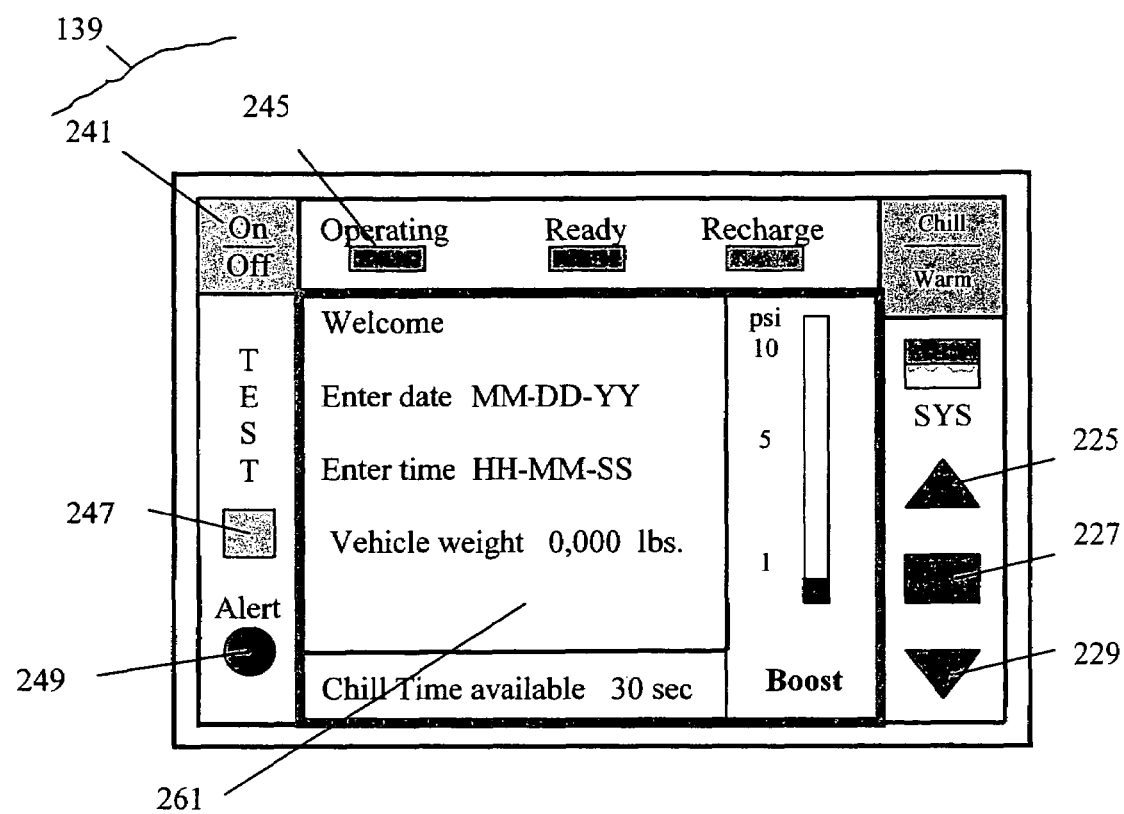
FIG. 6 shows a screen shot of the display portion of the SSCFFC system for initial calibration.

FIG. 6 discloses an entry screen on display 139 for initial system calibration. The interface is the same as FIG. 2a except returning to FIG. 6 area 261 is displaying a calibration interface. This configuration will utilize switches 241 and 247. The lamps 245 and 249 will also be incorporated. Operators will also employ switches 225, 229 and 227. Additionally, lamp 249 will be used. When all information is as desired operator will press 227 twice and normal display as in FIG. 2a will appear.

Installation

To install the preferred embodiment SSCFFC in a vehicle the following steps should be followed.

1. Install conditioner 101 assembly as shown in FIG. 5a or as required on specific vehicle. The area between the radiator wall in front of engine compartment and the grill should allow adequate mounting area and good airflow. A hood scoop is also an attractive mounting location.
2. A penetration in radiator wall where the outlet 134 (FIG. 5c) exits conditioner 101 must be made prior to installing assembly. Select a location that will allow the hose 158 to be routed directly to the throttle body intake 150 (FIG. 1a) or at some convenient location of the existing input plumbing.
3. With intake hole existing position conditioner 101 in location and select bracketry mounting locations that will stabilize assembly but not interfere with operation of assembly or existing devices. Mount bracketry and install inlet hoses. Both of these steps will be unique for each vehicle type.
4. Connect hose 158 of appropriate size from output 134 (FIG. 1d) to desired engine intake (before body 150). And install appropriate hose clamps. The body 150 ends of hose 158 will be unique for each vehicle type. The output 134 will use hose 110 type of appropriate length and clamp 110a to secure intake hose.
5. Sensors T1, T2, T3, and T4 will be installed with connectors 123q in SSCFFC 101 at locations shown FIG. 1a. Referring to FIG. 5b the hole 239 should be drilled in manifold 144m. An adapter or supplemental machining may be required to establish a flat surface around hole 239 to enable sealing between manifold 144m and sensor AS mounting. Position hole 233 to allow sensor AS maximum exposure to direct exhaust gas flow. The washer 233 (inside) with tabs 233t should next be welded (heliarc) to manifold 144m around hole 239. The washer 235 (inside) should be placed over nose on sensor AS. The sensor AS should be slid into washer 235 (inside) and hole 239. The washer 235 (outside) with tabs 233t should now be slid over cable side of sensor AS followed by washer 233 on top of washer 235. The wire 237 should be laced through loops (both sides) on inside and outside washer 233 and pulled to equal tightness to seal sensor AS to manifold 144m. The wire 237 ties should use aircraft bolt securing techniques and be checked and tightened after initial operation. The sensor T5 will have connector 123q but will have to be mounted in exhaust header. The sensor T5 can be drilled and threaded with a ¼" NF thread near sensor AS. Sensor AS comes with a cable and bnc connector on controller 133 end.
6. Auxiliary equipment including controller 133, power buffer 143, and auxiliary power 145 should be mounted as shown in FIG. 5a or as required in specific vehicle. Each engine compartment will be different where to mount these devices. The mounting sites should be selected for good airflow and clearance from existing devices. Mounting and orientation will determine length and routing of power cables.
7. Display 139 is best mounted in cabin for operator access. Depending on cabin and dashboard configuration of host vehicle display 139 can be mounted in operator view with brackets or 2-sided Velcro with glue backing.
8. Vehicle interface OBD-2 connector 126p is located under dash on driver side. Cable 126 vehicle end should be plugged into 126p. The cable 126 should be routed through firewall to engine compartment and plugged into controller 133 at 126d.
9. The cable 140 should plug in to display connector 209, routed through firewall and connected to controller 133 at connector 140p.
10. The cable 129 should be connected to the respective sensors T1 through T5. Care should be taken to avoid heat-producing devices and excess cabling should be neatly dressed away from interfering with existing devices.
11. The controller end of cable 129 should be connected to controller 133 at connector 129t.
12. The sensor AS cable 129a should be routed to controller 133 and connected to connector 129b
13. The actuator 123 cable 123d should be routed from controller 133 and connected to connector 123c at actuator 123.
14. The fan cable 123d should be routed from controller 133 and connected to fan 108 at connector 123q.
15. The TED 107 cable 156c should be routed from controller 133 to TED 107 and connected at connector 156r.
16. The motor 111 cable 156m (if supercharger is included) should be routed from controller 133 to motor 111 and connected at connector 156q.
17. When all mounting and connections are complete an operator initializes SSCFFC (referring to FIG. 6) by selecting On at switch 241. The lamps 245 and 249 will illuminate. The system is requesting basic starting information in area 261. The cursor will initialize on the Enter date line, at MM. Operators can navigate by selecting a numerical increase by pressing switch 225, decreasing by pressing switch 229 and enter (and to next entry) switch 227. Operator should now enter current date, time and vehicle weight. Operators should follow the same procedure for time entry and weight. If an invalid entry is attempted lamp 249 will illuminate and cursor will highlight problem area. When all information is as desired operator will press 227 twice and normal display as in FIG. 2a will appear.
18. System calibration can be entered at anytime by pressing switches 247 and 227 until entry screen 261 as in FIG. 8 is displayed.
19. System will now operate as discussed in FIGS. 4 and 5 without operator intervention or as desired (warm mode, test, and calibrate).

Advantages of the Invention

From the description above, a number of advantages of the SSCFFC invention become evident: Interface of SSCFFC to engine load permits virtual and actual on demand selectivity of temperature and boost conditioning for emergencies or as required.

Incorporation of SSCFFC with sensor array with advanced sensor permits production of maximum power with minimum engine strain.

Incorporation of SSCFFC with sensor array with advanced sensor for measurement of critical temperature and combustion signatures provides ability to detect and moreover counteract the abnormal combustion such as detonation and pre-ignition. Use of SSCFFC facilitates practicable use of active temperature (chilling and warming) and boost conditioners in an automated fashion thereby allowing vehicles to have smaller engines; consume less fuel and produce less exhaust while maintaining on demand power and performance.

Use of SSCFFC with active temperature conditioners and temperature sensors allows automated and controlled heating of engine intake air thereby improving cold condition starting.

Use of SSCFFC permits automatic control of inlet air temperature assisting in the prevention of engine incomplete combustion by eliminating out of temperature range air supply.

Use of SSCFFC permits rapid and efficient use of temperature conditioning while vehicle is stationary or in traffic.

Use of SSCFFC permits temperature and boost conditioning operation that avoids draining host power during high demand modes.

Use of SSCFFC permits auxiliary power inclusion to increase operational flexibility and duration.

SSCFFC incorporates with existing engine strategies for increased power output from aided and unaided engines.

4. Conclusions, Ramifications, and Scope

Accordingly, the reader will see that capabilities of this SSCFFC invention can be used to improve the performance, efficiency, emissions, and life span of systems using this technology. Furthermore, the attributes mentioned above will allow SSCFFC to complement new active intercoolers and advanced air boosting devices. Additionally, operational software flexibility will allow improvements of "on-demand" use. Use of the invention to control active intercoolers with pre-charging or stored BTUs from an FFC will allow more power to be available during peak demand periods. Combination with advanced sensor technology such as the exhaust pressure sensor will allow even more accurate recognition of engine states and allow the SSCFFC to more quickly react and compensate to improve performance and terminate combustion problems including detonation and pre-ignition.

Advantages to the SSCFFC invention are dependant on specific applications. Internal combustion engines only require temperature conditioning during peak power applications. The SSCFFC invention facilitates on demand temperature control while minimizing battery drain. The capacity for chilling compressed fluids is stored in the internal heat exchanger (plates, probes or diffuser) and energized from battery or auxiliary power. This allows the energy stored in the exchanger and battery during normal or braking conditions to be stored up and optimally used under SSCFFC control during peak demand situations e.g. passing, freeway merging, hill climbing, and even cold start situations.

Hybrid vehicles with very small engines and electric motors are ideal for SSCFFC control applications. Electric superchargers, due to their similar "on demand" operation and battery power, will be particularly compatible and be more effective in producing higher horsepower and torque with SSCFFC's optimal control of incoming air temperature reductions.

What is claimed is:

1. An internal combustion engine processor control system for temperature conditioning, BTU storage, and pressurizing an amount of incoming air into the engine, comprising:
    a family of sensors providing demand sensing means for the processor determining a level of the engine load;
    an incoming air flow diverter actuator control means for the processor selecting from a plurality of pathways for incoming air;
    an incoming air thermo sensing means for the processor measuring the temperature of an insulated thermal BTU storage core;
    an engine load sensing means for the processor measuring the amount of pressurization required by the engine;
    the processor device capable of executing a program logic flow stored in the processor program memory for controlling said demand sensing means and said thermo sensing means and a flow diverter actuator means and flow controlling BTU storage means;
    the processor program logic flow stored in the processor program memory adapted to run on the processing device, [the] a processor temperature conditioning program logic flow means adapted to analyze data of said demand sensing means and said thermo sensing means and compare to predetermined patterns in a processor lookup table stored in the processor program memory accessing through the flow diverters said BTU storage from previous operations for subsequent computing solutions as determined;
    a processor thermal current control means for the processor regulating an amount of current driving a thermoelectric device for temperature conditioning of incoming air to optimize combustion temperatures; and
    a processor adjustable electric boost motor drive pulse width modulation means for the processor regulating an amount of energy driving [the] an electric boost motor to achieve a desired motor speed pressurizing incoming air to optimize engine operational efficiency.

2. The internal combustion engine processor control system for an internal combustion engine temperature conditioning, BTU storage, and pressurization of incoming air according to claim 1, wherein the load demand sensing is an engine load determining sensor for the processor sensing throttle setting or engine load.

3. The internal combustion engine processor control system for an internal combustion engine temperature conditioning, storage, and pressurization of incoming air according to claim 1, wherein the flow diverter actuator is an engine airflow diverter signal means for the processor controlling an actuator regulating incoming air pathway for engine aspiration.

4. The internal combustion engine processor control system for an internal combustion engine temperature conditioning, storage, and pressurization of incoming air according to claim 1, wherein the thermoelectric device is a thermoelectric cooler or thermo tunneling device controlled by the processor.

* * * * *